United States Patent
Ahiska

(10) Patent No.: US 9,602,700 B2
(45) Date of Patent: *Mar. 21, 2017

(54) METHOD AND SYSTEM OF SIMULTANEOUSLY DISPLAYING MULTIPLE VIEWS FOR VIDEO SURVEILLANCE

(75) Inventor: Yavuz Ahiska, Esher (GB)

(73) Assignee: GRANDEYE LTD., London (GB)

( * ) Notice: Subject to any disclaimer, the term of this patent is extended or adjusted under 35 U.S.C. 154(b) by 960 days.

This patent is subject to a terminal disclaimer.

(21) Appl. No.: 13/354,800

(22) Filed: Jan. 20, 2012

(65) Prior Publication Data

US 2013/0021434 A1    Jan. 24, 2013

Related U.S. Application Data

(63) Continuation of application No. 12/434,811, filed on May 4, 2009, now abandoned, which is a (Continued)

(51) Int. Cl.
*H04N 7/18* (2006.01)
*H04N 5/217* (2011.01)
(Continued)

(52) U.S. Cl.
CPC ....... *H04N 5/217* (2013.01); *G08B 13/19691* (2013.01); *H04N 5/23206* (2013.01); *H04N 5/23238* (2013.01); *H04N 7/181* (2013.01)

(58) Field of Classification Search
CPC ....................................... H04N 7/181
(Continued)

(56) References Cited

U.S. PATENT DOCUMENTS

| 3,725,563 A | 4/1973 | Woycechowsky |
| 4,543,601 A | 9/1985 | Harada et al. |

(Continued)

FOREIGN PATENT DOCUMENTS

| EP | 1341383 A2 | 9/2003 |
| WO | 02/062056 A1 | 8/2002 |

OTHER PUBLICATIONS

Comaniciu, D., Ramesh, V., and Meer, P., "Real-Time Tracking of Non-Rigid Objects Using Mean-shift," IEEE Computer Vision and Pattern Recognition, vol. 1 II, 2000, pp. 142-149.

(Continued)

*Primary Examiner* — Jeremaiah C Hallenbeck-Huber
(74) *Attorney, Agent, or Firm* — Groover & Associates PLLC; Robert O. Groover, III; Gwendolyn G. Corcoran

(57) ABSTRACT

Methods and systems of transmitting a plurality of views from a video camera are disclosed. The camera captures a plurality of views from the lens and scales the view to a specified size. Each view can correspond to a separate virtual camera view of a region of interest and separately controlled. The camera composites at least a portion of the plurality of views into one or more views within the camera, and then transmits one or more of the views from the video camera to a base station for compositing views from the camera into a single view within the base station. Cameras can be grouped into a network, with network addresses assigned to the camera and any virtual cameras generated therein.

14 Claims, 17 Drawing Sheets

Related U.S. Application Data continuation-in-part of application No. 12/263,875, filed on Nov. 3, 2008, now Pat. No. 8,243,135, and a continuation-in-part of application No. 10/837,326, filed on Apr. 30, 2004, now Pat. No. 7,528,881, and a continuation-in-part of application No. 10/837,019, filed on Apr. 30, 2004, now abandoned, and a continuation-in-part of application No. 10/837,012, filed on Apr. 30, 2004, now Pat. No. 7,529,424, said application No. 12/263,875 is a continuation of application No. 10/837,325, filed on Apr. 30, 2004, now Pat. No. 7,450,165.

(60) Provisional application No. 60/467,588, filed on May 2, 2003, provisional application No. 60/467,643, filed on May 2, 2003, provisional application No. 60/467,644, filed on May 2, 2003, provisional application No. 60/467,705, filed on May 2, 2003.

(51) Int. Cl.
   *G08B 13/196* (2006.01)
   *H04N 5/232* (2006.01)

(58) Field of Classification Search
   USPC .......................................................... 348/159
   See application file for complete search history.

(56) References Cited

U.S. PATENT DOCUMENTS

| | | | |
|---|---|---|---|
| 4,652,928 A | 3/1987 | Endo et al. | |
| 4,667,236 A | 5/1987 | Dresdner | |
| 4,728,839 A | 3/1988 | Coughlan | |
| 4,763,280 A | 8/1988 | Robinson et al. | |
| 4,821,209 A | 4/1989 | Hempel et al. | |
| 5,027,287 A | 6/1991 | Artigalas et al. | |
| 5,043,802 A | 8/1991 | Tarumizu et al. | |
| 5,185,667 A | 2/1993 | Zimmermann | |
| 5,321,776 A | 6/1994 | Shapiro | |
| 5,357,281 A | 10/1994 | Ikeda et al. | |
| 5,359,363 A | 10/1994 | Kuban | |
| 5,396,284 A | 3/1995 | Freeman | |
| 5,434,617 A | 7/1995 | Bianchi | |
| 5,495,292 A | 2/1996 | Zhang | |
| 5,526,041 A | 6/1996 | Glatt | |
| 5,623,309 A | 4/1997 | Yoshimura et al. | |
| 5,657,073 A * | 8/1997 | Henley | 348/38 |
| 5,666,157 A | 9/1997 | Aviv | |
| 5,684,937 A | 11/1997 | Oxaal | |
| 5,796,426 A | 8/1998 | Gullichsen et al. | |
| 5,809,161 A | 9/1998 | Auty et al. | |
| 5,838,365 A | 11/1998 | Sawasaki et al. | |
| 5,912,980 A | 6/1999 | Hunke | |
| 5,969,755 A | 10/1999 | Courtney | |
| 6,049,281 A | 4/2000 | Osterweil | |
| 6,097,430 A | 8/2000 | Komiya et al. | |
| 6,147,709 A | 11/2000 | Martin et al. | |
| 6,166,729 A | 12/2000 | Acosta et al. | |
| 6,188,777 B1 | 2/2001 | Darrell et al. | |
| 6,211,911 B1 | 4/2001 | Komiya et al. | |
| 6,215,519 B1 | 4/2001 | Nayar et al. | |
| 6,243,099 B1 | 6/2001 | Oxaal | |
| 6,275,617 B1 | 8/2001 | Kondo | |
| 6,289,165 B1 | 9/2001 | Abecassis | |
| 6,344,852 B1 | 2/2002 | Zhu | |
| 6,345,129 B1 | 2/2002 | Aharon | |
| 6,346,967 B1 | 2/2002 | Gullichsen et al. | |
| 6,359,647 B1 | 3/2002 | Sengupta et al. | |
| 6,424,370 B1 | 7/2002 | Courtney | |
| 6,483,532 B1 | 11/2002 | Girod | |
| 6,498,598 B2 | 12/2002 | Watanabe | |
| 6,509,926 B1 | 1/2003 | Mills et al. | |
| 6,556,241 B1 | 4/2003 | Yoshimura et al. | |
| 6,597,393 B2 | 7/2003 | Kato et al. | |
| 6,628,835 B1 | 9/2003 | Brill et al. | |
| 6,675,386 B1 | 1/2004 | Hendricks et al. | |
| 6,677,990 B1 | 1/2004 | Kawahara | |
| 6,690,374 B2 | 2/2004 | Park et al. | |
| 6,697,104 B1 | 2/2004 | Yakobi et al. | |
| 6,724,421 B1 | 4/2004 | Glatt | |
| 6,731,805 B2 | 5/2004 | Brodsky et al. | |
| 6,754,367 B1 | 6/2004 | Ito et al. | |
| 6,757,434 B2 | 6/2004 | Miled et al. | |
| 6,763,068 B2 | 7/2004 | Oktem | |
| 6,813,372 B2 | 11/2004 | Standridge et al. | |
| 6,819,355 B1 | 11/2004 | Kiikawa | |
| 6,937,284 B1 | 8/2005 | Singh et al. | |
| 6,970,183 B1 | 11/2005 | Monroe | |
| 6,975,350 B1 | 12/2005 | Mohammed et al. | |
| 6,977,373 B2 | 12/2005 | Yoshinari et al. | |
| 6,977,672 B1 | 12/2005 | Okuno | |
| 6,977,676 B1 | 12/2005 | Sato et al. | |
| 6,980,233 B1 | 12/2005 | Hirasawa | |
| 6,980,236 B1 | 12/2005 | Kojima et al. | |
| 6,982,654 B2 | 1/2006 | Rau et al. | |
| 7,015,949 B1 | 3/2006 | Sah | |
| 7,025,275 B2 | 4/2006 | Huang et al. | |
| 7,034,927 B1 | 4/2006 | Allen et al. | |
| 7,058,237 B2 | 6/2006 | Liu et al. | |
| 7,130,383 B2 | 10/2006 | Naidoo et al. | |
| 7,148,914 B2 | 12/2006 | Bronson | |
| 7,161,616 B1 | 1/2007 | Okamoto et al. | |
| 7,161,619 B1 | 1/2007 | Niida et al. | |
| 7,173,650 B2 | 2/2007 | Cohen-Solail et al. | |
| 7,202,888 B2 | 4/2007 | Tecu | |
| 7,218,761 B2 | 5/2007 | McClurg et al. | |
| 7,286,185 B2 | 10/2007 | Wong et al. | |
| 7,295,228 B2 | 11/2007 | Roberts et al. | |
| 7,352,915 B2 | 4/2008 | Nose et al. | |
| 7,477,205 B1 | 1/2009 | de Waal et al. | |
| 7,528,881 B2 | 5/2009 | Ahiska | |
| 7,529,424 B2 | 5/2009 | Ahiska | |
| 2003/0071891 A1* | 4/2003 | Geng | H04N 5/2259 348/39 |
| 2003/0085998 A1* | 5/2003 | Ramirez-Diaz et al. | 348/143 |
| 2003/0128756 A1 | 7/2003 | Oktem | |
| 2004/0105006 A1* | 6/2004 | Lazo et al. | 348/169 |
| 2005/0007453 A1 | 1/2005 | Ahiska | |

OTHER PUBLICATIONS

A. M. Bagci, Y. Yardimci, A. E. Cetin, "Moving Object Detection Using Adaptive Subband Decomposition and Franctional Lower-Order Statistics in Video Sequences," Signal Processing, 82 (12): 1941-1947, Dec. 2002.

Y. Yardimci, L. Yilmaz, A. E. Cetin, "Correlation Tracking Based on Wavelet Comain Information," Proceedings of SPIE vol. #5204, San Diego, Aug. 5-7, 2003.

C. Stauffer, W. Grimson, "Adaptive Background Mixture Models for Real-Time Tracking," Proc. IEEE CS Conf. on Computer Vision and Pattern Recognition, vol. 2, 1999, pp. 246-252.

Collins, Lipton and Kanade, "A System for Video Surveillance and Monitoring," in Proc. American Nuclear Society (ANS) Eighth International Topical Meeting on Robotics and Remote Systems, Pittsburgh, PA, Apr. 25-29, 1999.

Aube, 12th International Conference on Automatic Fire Detection, 2001.

X. Zhou, R. Collins, T. Kanade, and P. Metes, "A Master-Slave System to Acquire Biometric Imagery of Humans at Distance", ACM International Workshop on Video Surveillance, Nov. 2002.

* cited by examiner value = i(aA + cB + bC + dD)
      + i(aE + cF + bG + dH)

METHOD AND SYSTEM OF SIMULTANEOUSLY DISPLAYING MULTIPLE VIEWS FOR VIDEO SURVEILLANCE

CROSS-REFERENCE TO RELATED APPLICATIONS

The present application is a continuation of U.S. patent application Ser. No. 12/434,811, filed May 4, 2009, now abandoned, which is a continuation in part of:

U.S. patent application Ser. No. 10/837,012, filed Apr. 30, 2004, now issued as U.S. Pat. No. 7,529,424, which claims priority of U.S. Provisional Application 60/467,705, filed May 2, 2003, now expired.

U.S. patent application Ser. No. 12/263,875, filed Nov. 3, 2008 now U.S. Pat. No. 8,243,135, which is a continuation of U.S. patent application Ser. No. 10/837,325, filed Apr. 30, 2004, now issued as U.S. Pat. No. 7,450,165, and claims priority of U.S. Provisional Application 60/467,588, filed May 2, 2003, now expired.

U.S. patent application Ser. No. 10/837,326, filed Apr. 30, 2004, now issued as U.S. Pat. No. 7,528,881, which claims priority of U.S. Provisional Application 60/467,643, filed May 2,2003, now expired.

U.S. patent application Ser. No. 10/837,019, filed Apr. 30, 2004, now abandoned, which claims priority of U.S. Provisional Application 60/467,644, filed May 2, 2003, now expired.

All of the above applications and issued patents are incorporated herein by reference in their respective entireties.

BACKGROUND

The inventions relate generally to cameras and specifically to the design of a camera that corrects distortion introduced by optical components which can capture wide field of view by processing image data.

Note that the points discussed below may reflect the hindsight gained from the disclosed inventions, and are not necessarily admitted to be prior art.

BRIEF DESCRIPTION OF THE DRAWINGS

The disclosed inventions will be described with reference to the accompanying drawings, which show important sample embodiments of the inventions and which are incorporated in the specification hereof by reference, wherein.

DETAILED DESCRIPTION OF SAMPLE EMBODIMENTS

Video surveillance systems using wide-angle optical systems apply image processing to enhance or obscure visual information as necessary. It is useful to be able to define the extents within which image processing operations should take place; for example moving region detection and object tracking software may define the bounding box of a suspicious object and use it to direct enhancement processing to the appropriate area of the image. Regions of interest (ROIs) can be identified in the image based on motion, color, behavior, or object identification. Computer algorithms and programs can be implemented at the camera or at a monitoring base station to automate selection of the ROIs, motion tracking, sound an alarm, summon emergency responders, activate responsive systems (e.g., close doors, seal bulkhead, activate ventilation or fire-suppression system, etc.), or other actions as programmed into the system. Further, the object tracking, or alarm, or other processing can be performed on the corrected or on uncorrected versions of the images or video.

In many surveillance systems, standard pan-tilt-zoom (PTZ) cameras capture images of an area. A PTZ camera relies on mechanical gears to adjust the pan, tilt, and zoom of the camera. These cameras have various disadvantages or limitations in surveillance system. Typically, adjusting to concentrate on a region of interest (ROI) necessarily requires a PTZ camera to adjust its view to the ROI and lose sight of the overall area. PTZ cameras are also prone to mechanical failure, misalignment during maintenance, and are relatively heavy and expensive.

Figure 1:
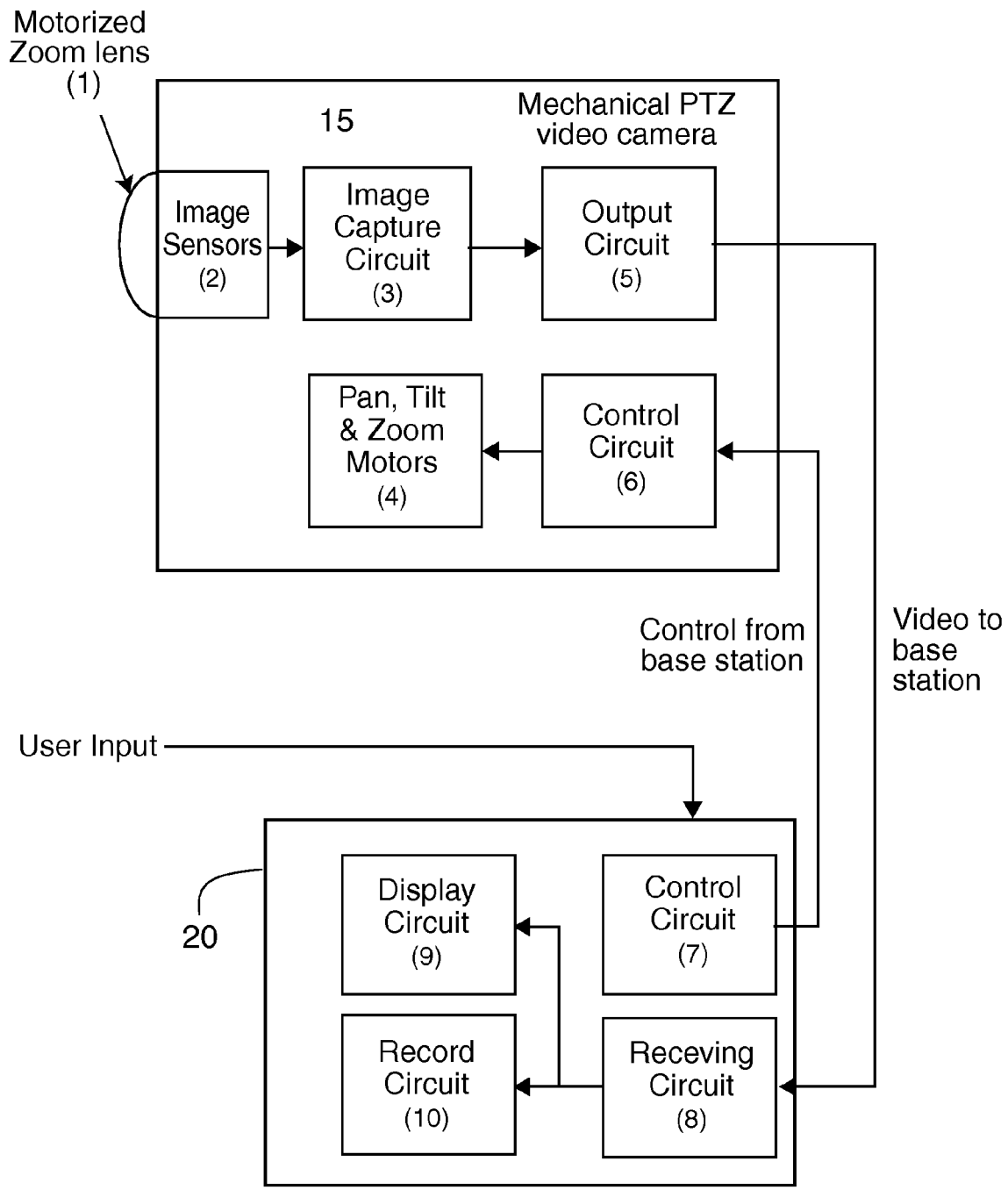
FIG. 1 is a block diagram illustrating a prior art implementation of a PTZ video camera and base station.

FIG. 1 is an example of such a prior art conventional mechanical PTZ camera. Video camera 15 possesses a mounted zoom lens 1 receiving light and an image on an image sensor 2, which sends a signal to an image capture circuit 3. An example can be a real-time video feed, representing the light impinging on image sensor 2. Output circuit 5 receives a signal from the image capture circuit 3 and transmits the captured image to a video feed to a base station 20. The PTZ camera 15 also includes a control circuit 6 that receives control input from the base station 20 control circuit 7 to control the pan, tilt, and zoom motors.

A base station 20 is coupled to the PTZ camera by a video feed input and a control output. The base station 20 includes a receiving circuit 8 receiving video from the camera 15. The display circuit 9 provides a view of the captured image, while record circuit 10 records the received images. Control circuit 7 may receive input from a user directing the video camera 15 to pan, tilt, and zoom. Control circuit 7 provides the appropriate inputs to control circuit 6.

Surveillance systems commonly activate an alarm on the basis of detected movement within its field of vision. Commonly, motion detection depends on a comparison of the current video frame against a previous frame; if a region of the frame changes significantly it is considered to be a moving object.

In more recent surveillance systems, a new class of cameras replaces the mechanical PTZ mechanisms with a wide-angle optical system and image data processing by electronic circuitry within the camera. This type of camera monitors a wide-angle field of view and selects ROIs from the view to transmit to a base station. The image data processing can correct distortions and selectively process the ROIs with different scaling; in this way it emulates the behavior of a mechanical PTZ camera. The wide-angle view can be as much as 180° and capture a full hemisphere of visual data. The wide-angle optics (such as a fisheye lens) introduces distortion into the captured image and processing algorithms operating on image processing circuitry corrects the distortion and converts it to a view analogous to a mechanical PTZ camera. This flexibility to control and vary the captured views by data processing can be thought of as implementing one or more virtual cameras, each able to be independently controlled, by processing captured image data from the single optical system, or even a combination of several optical systems, to emulate one or more PTZ cameras.

The present application discloses new approaches to displaying multiple views from a video camera.

In some embodiments, the inventions include compositing a plurality of views from a video camera. The camera captures a plurality of views and scales the plurality of views to a specified size. The camera composites at least a portion of the plurality of views into one or more views within the camera and transmits one or more of the views from the video camera to a base station. The base station may display the composite view generated in the camera or composing views from the camera converted into a single view within the base station.

The disclosed innovations, in various embodiments, provide one or more of at least the following advantages. However, not all of these advantages result from every one of the innovations disclosed, and this list of advantages does not limit the various claimed inventions.

Simultaneous display of multiple ROI.
Compositing views preserving image data covering the entire captured field-of-view.
Flexibility of displayed images as to selection and display regions including superimposed display or adjacent display, or combinations thereof.
Differential scaling of composited images.
Ability to cope with multiple types of distortion permits better quality image from lower cost lens.
Capability for additional image processing.
Ability to adapt to many applications, such as robotic vision.

The numerous innovative teachings of the present application will be described with particular reference to presently preferred embodiments (by way of example, and not of limitation). The present application describes several inventions, and none of the statements below should be taken as limiting the claims generally.

The inventions include image-processing circuitry and discloses how the parameters used in the correction may be obtained automatically or manually. Correction of optical distortion has many advantages including, but not limited to, the possibility of achieving high quality images from low cost optical systems. The inventions apply equally to still and video cameras.

The described embodiments include the capability to select a region of a captured image (such as one or more frames of video), whether processed or not, and to perform other processing on that region. In one example implementation, the innovative camera captures an image, such as wide-angle video (but not limited thereto), and corrects the wide-angle view to create a corrected view (i.e., not distorted or less distorted view) that is sent to an operator. The operator (or specially designed software) can then define or designate a ROI for observation. In other embodiments, some processing is performed at different steps, such as object tracking (for example). This and other examples are summarized and described more fully below.

In a fisheye or other optical system capturing a near 180° field of view, the captured 3D world space hemispherical image appears distorted, and can comprise what is sometimes referred to as a fisheye view. Image processing algorithms can correct this view to a more conventional 2D depiction on a monitor and also emulate the movement of a PTZ camera. The wide-view camera can simultaneously focus on multiple ROIs while still able to monitor the area within its field of view. This type of camera may be used to improve the processing of selected ROIs, because a wide field is always captured by the camera, and there is no need for mechanical movement or adjustment of the camera's lens system. A method of modeling the visible world as 3D world space on a p-sphere including texture mapping is found in "Method for Interactive Viewing Full-Surround Image Data and Apparatus Therefor," U.S. Pat. No. 6,243,099 to Oxaal, which is incorporated by reference herein, and "Method for Interactively Viewing Full-Surround Image Data and Apparatus Therefore," application Ser. No. 10/602,666 filed Jun. 25, 2003 by Oxaal, which is incorporated by reference herein.

The image processing is typically performed on digital image data (although an analog video signal can be subjected to similar image processing). The captured image data is converted into a digital format for image data processing at the camera. The processed data can than be transmitted to a base station for viewing. The image data can be converted to an analog signal for transmission to the base station, or the image data can be left in the processed digital format. Additionally, the input signal to the base station, either analog or digital, can be further processed by the base station. Again, image processing and ROI selection at the camera can be fully automatic or subject to various control inputs or overrides that effect automatic image data processing. Manual, automatic, or a combination of control options utilizing the combination of the base station and internal camera circuitry can be implemented.

Different lens/image sensor combinations produce different types and degrees of distortion. This distortion makes viewing or interpreting an image difficult. Furthermore, an optical system may be designed with distortions to provide a specific field of view. The image processing system can reduce and correct distortion in different lens/image sensor combinations. Although a fisheye lens is contemplated in most camera systems, other wide-angle lens and optical systems can be utilized.

Using a wide-angle lens and correcting the view via electronic image data processing, a ROI can be selected. The image data processing allows zooming in on a ROI or other area without loosing the ability to maintain security or a view of the remaining area or other ROIs. Many retail stores currently use PTZ cameras for surveillance of customers to prevent shoplifting and deter robberies. A camera pointed and zoomed appropriately can observe a person in detail to distinguish between innocent behavior or theft. Commonly, security personnel monitor customers with PTZ cameras as they move around the store. Manual tracking is limited by attention span and the number of targets that can be tracked. Similarly, manual observation is unsuitable for other security related tasks, such as smoke detection, left package, and face recognition. Switching to a wide-angle camera that corrects the view via electronic image data processing to emulate a PTZ can greatly improve surveillance. A single wide-angle camera can maintain area surveillance while simultaneously monitoring multiple ROIs, providing multiple simultaneous views to a surveillance monitor displaying the video or camera view images.

Automatic motion detection and object tracking was developed to facilitate security monitoring by closed circuit television, and can be easily deployed in a wide-angle camera surveillance system. Automatic motion detection can be accomplished by comparing a live video image with a stored earlier image to detect relative motion on the basis of a difference between the images. Automatic object tracking is more sophisticated, identifying a moving object and following its movement. One method of operation with PTZ cameras uses a fixed spotting camera coupled with a PTZ camera directed to the target's location. Information for driving the PTZ is obtained with reference to the difference between a current image and a previous image from the spotting camera.

By using a wide-angle camera performing internal image processing, automatic motion detecting and object tracking software within the camera can emulate a PTZ camera to detect motion and implement object tracking. A ROI can be designated for those areas/objects identified by the software and tracked via image data processing. The benefits realized include total system processing power rising in proportion to the amount of video data captured. This inherent scaling reduces deployment costs, because computing power does not need to be over-specified when first installed to account for any anticipated expansion of the system. Additionally, an object's movement can be transferred to one or more base stations or other cameras by transmitting the object's spatial coordinates and/or trajectory.

Automatic behavior analysis software in conjunction with object tracking and motion detection can be used to filter abnormal from normal behavior. One method for implementing this idea samples video signals of an individual's movement with indicative movements of criminal behavior. The level of criminal behavior can be evaluated and an appropriate alarm generated. Other automatic analysis software can identify unattended objects, smoke, fire, leaks, or other hazards. Internal circuitry of the camera can perform the automatic analysis using algorithms during image processing. Many different algorithms can be executed on the video data, and the camera can be customized according to the surveillance environment (e.g., a bank entrance versus monitoring a hazardous material storage area).

In-camera analysis software can be advantageous by reducing the quantity of data transmitted, but this automatic analysis can also be performed at a base station. These algorithms generally produce more accurate results if applied to high-resolution image data. For high-resolution image data, the quantity of data transmitted could become prohibitive. For this reason, prior art systems performing analysis at a base station cannot cope with the demands of a large security system where hundreds of cameras may be used to monitor behavior. The data flow in such systems might exceed 1 Tetra-bit (one million million bits) per second. Such a system would be prohibitively expensive to deploy and operate. Additionally, if using a PZT camera to track a single object, the number of cameras required must be very large or many identified candidates for tracking ignored. The ability of a wide-angle camera as disclosed herein to track multiple objects with a single camera greatly improves the quality of surveillance and the efficiency of the system. The in-camera image data processing can efficiently process the image data to implement automatic object recognition and tracking, motion detection, and behavior analysis. Updates to the software can be done via disk or over a network connection, and the software program can reside in a memory, disk, flash drive, or other computer readable medium.

Internet Protocol (IP) video cameras are becoming wide spread in surveillance and inspection but are limited to providing a single network address for each camera. Internet Protocol [ISI81] operates within the network layer of the International Standard Organization's Open System Interconnect model [ISO94]. In this system, packets of data transmitted through a network are marked with addresses that indicate their destination. Established routing algorithms determine an appropriate path through the network such that the packet arrives at the correct device. Packets also contain information that indicates the address of the sending device such that the receiving device may reply to the transmitter.

In a networked surveillance or inspection system, one or more base stations are connected to one or more cameras by a network. In an IP-based network, a unique network address identifies each individual IP camera and each base station. A base station transmits commands to individual cameras by transmitting packets addressed to their unique network address. The network cameras transmit information and digital video data to a specific base station by transmitting packets marked with the base station's unique network address. A base station can broadcast packets to more than one camera by using broadcast aspects of the Internet Protocol, and a camera may broadcast data to more than one base station by similar means. Typically, a stream of data packets is used to transmit a video image data feed. Each network captures image data and transmits it to the network base stations, which displays the entire image captured by camera.

Due to advances in very-large-scale integration (VLSI) technology, internal camera circuitry can process video image data to identify moving objects in the video in real-time. Intelligent surveillance systems incorporating VLSI and tracking algorithms can identify moving objects by analyzing the trajectory of the moving objects. A typical video scene consists of foreground and background objects.

Foreground objects temporarily stay in the video. By tracking objects in the video image data, such as moving objects or foreground objects, useful information can be extracted.

One example of a lens compatible with the inventions is a fisheye lens. Fisheye lenses have traditionally been used to capture environments. This type of lens was first developed to allow astronomers to capture the entire hemisphere of the night sky with one photograph. All lenses have some amount of distortion but it is greatest in those of shorter focal length and wider field of view. Algorithms for correcting this distortion have been around for some time and there are published algorithms on the correction of image distortion resulting from a wide angle fish-eye lens including a technique known as environment mapping.

Figure 2:
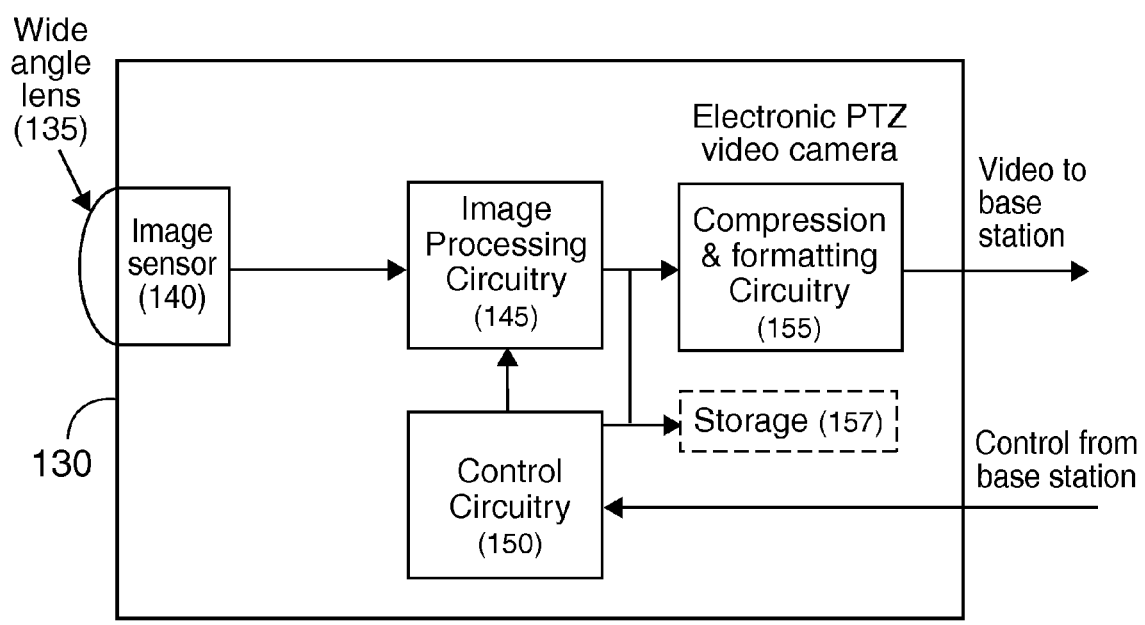
FIG. 2 is a block diagram illustrating one embodiment of the inventions.

FIG. 2 is a block diagram illustrating one embodiment of the inventions. Video camera 130 includes wide-angle optical lens 135, in one embodiment a fisheye lens. Image sensor 140 is connected to lens 135, image processing circuit 145, control circuit 150, and output circuit 155, which in one embodiment is a compression and formatting circuit. In normal operation, lens 135 projects a wide-angle view of a scene under observation onto image sensor 140. Image sensor 140 can comprise a CCD or CMOS device, or other sensor, which converts the light falling upon it into electrical signals that the supporting circuitry converts to a form suitable for use by image processing circuit 145. This conversion typically includes conversion from an analog signal to a digital signal of an appropriate format.

The output of image sensor 140 is a digital representation of the image projected by lens 135. The wide-angle nature of lens 135 causes this image to be distorted to such a degree that recognition of the scene will be poor. In general the nature of the distortion will depend upon the shape of lens 135 and its position relative to image sensor 140. Variations in manufacturing tolerances may cause the distortion to differ between individual examples of the video camera. Output circuit 155 may provide output to a base station (not shown), while control circuit 150 may receive input from a base station (not shown).

One purpose of image processing circuit 145 is to correct the distortion introduced by the lens-sensor combination. One method of correction uses mapping tables to correct the distortion. The tables may be used to remove many forms of geometric distortion and are not limited to spherical distortion, and can employ either a forward mapping or reverse mapping approach to removing distortion. The image processing circuit may also filter, color correct, adjust the white balance, or apply other routine processing operations expected of a camera on the distorted or the corrected image to improve its appearance. Some of these functions could be executed in application specific processors which may be a part of the image processing circuit. In addition to correcting optical distortion the image processing circuit 145 can be used to watermark the transmitted video to protect against tampering. Other methods of correcting distortion are well known by those skilled in the art. In one embodiment, image processing circuit 145 is implemented in a programmable device such as a digital signal processor, for example Texas Instruments TMS320C6414, which may be used to execute other algorithms upon the image including, but not limited to, sharpening, contrast adjustment, color adjustment, and resizing. It should, however, be clear to those skilled in the art that the algorithms mentioned here may be implemented with a combination of fixed-function and programmable hardware, or solely by fixed-function hardware.

Figure 3:
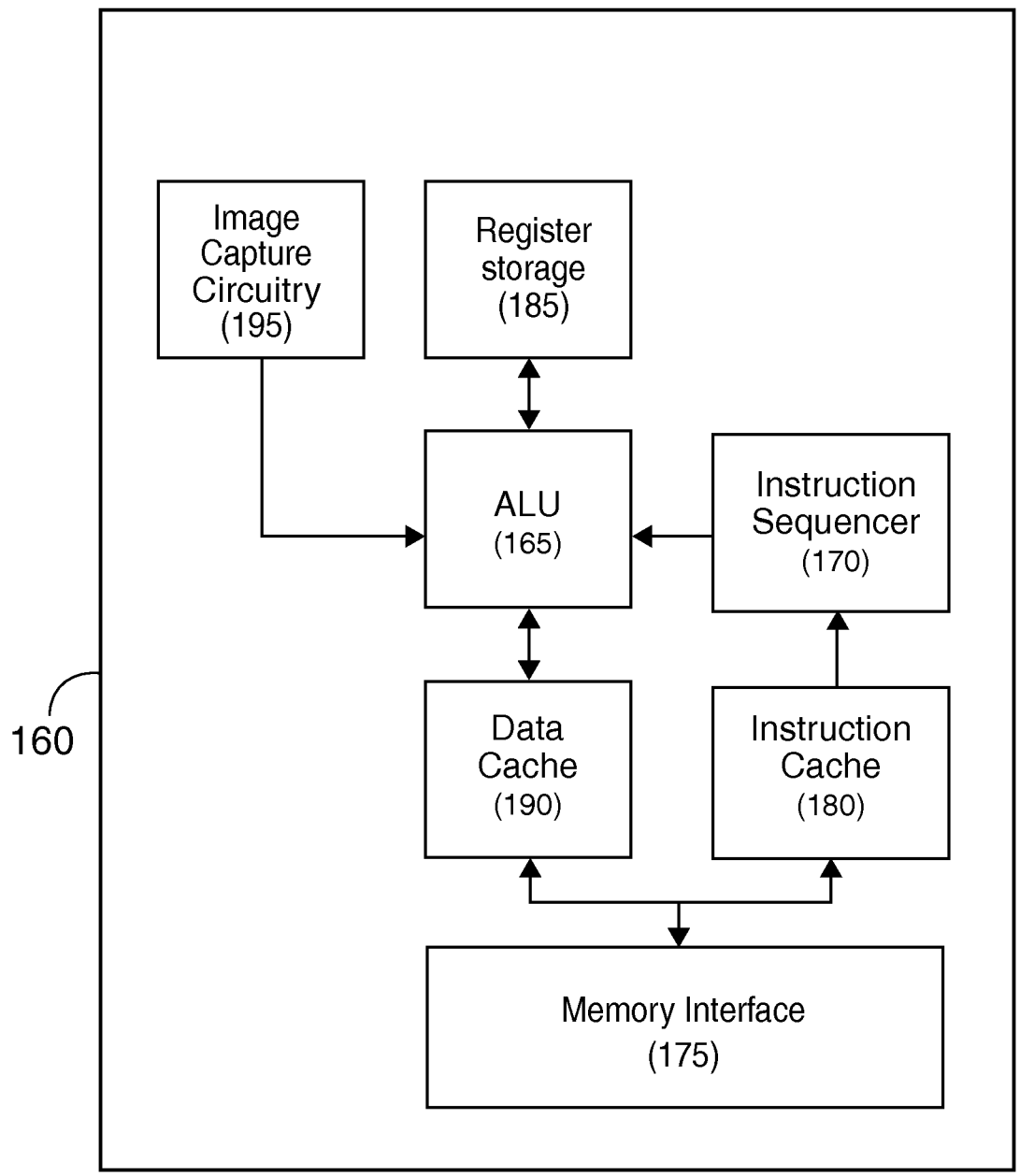
FIG. 3 is a block diagram illustrating one embodiment of the image processing circuit of FIG. 2.

FIG. 3 is a block diagram illustrating one embodiment of the image processing circuit of FIG. 2. In one embodiment image processing circuit 145 is represented by digital signal processor (DSP) 160, as shown in FIG. 3. In this arrangement arithmetic and logic unit (ALU) 165 is controlled by instruction sequencer 170 that in turn fetches instructions from memory 175 via instruction cache 180. The instructions executed by instruction sequencer 170 may cause ALU 165 to operate upon data held in register storage 185 or memory 175 accessed via data cache 190, or the output of image capture circuitry 195. DSP 160 may be used to execute other algorithms upon the image including, but not limited to, sharpening, contrast adjustment, color adjustment, resizing, or analysis algorithms such as motion detection, smoke detection, or abandoned package detection. The algorithms or programs to execute may be held in volatile or non-volatile memory within the camera and may be loaded at the time of manufacture, or as an upgrade procedure in the field, or downloaded to the camera during normal operation.

Figure 4:
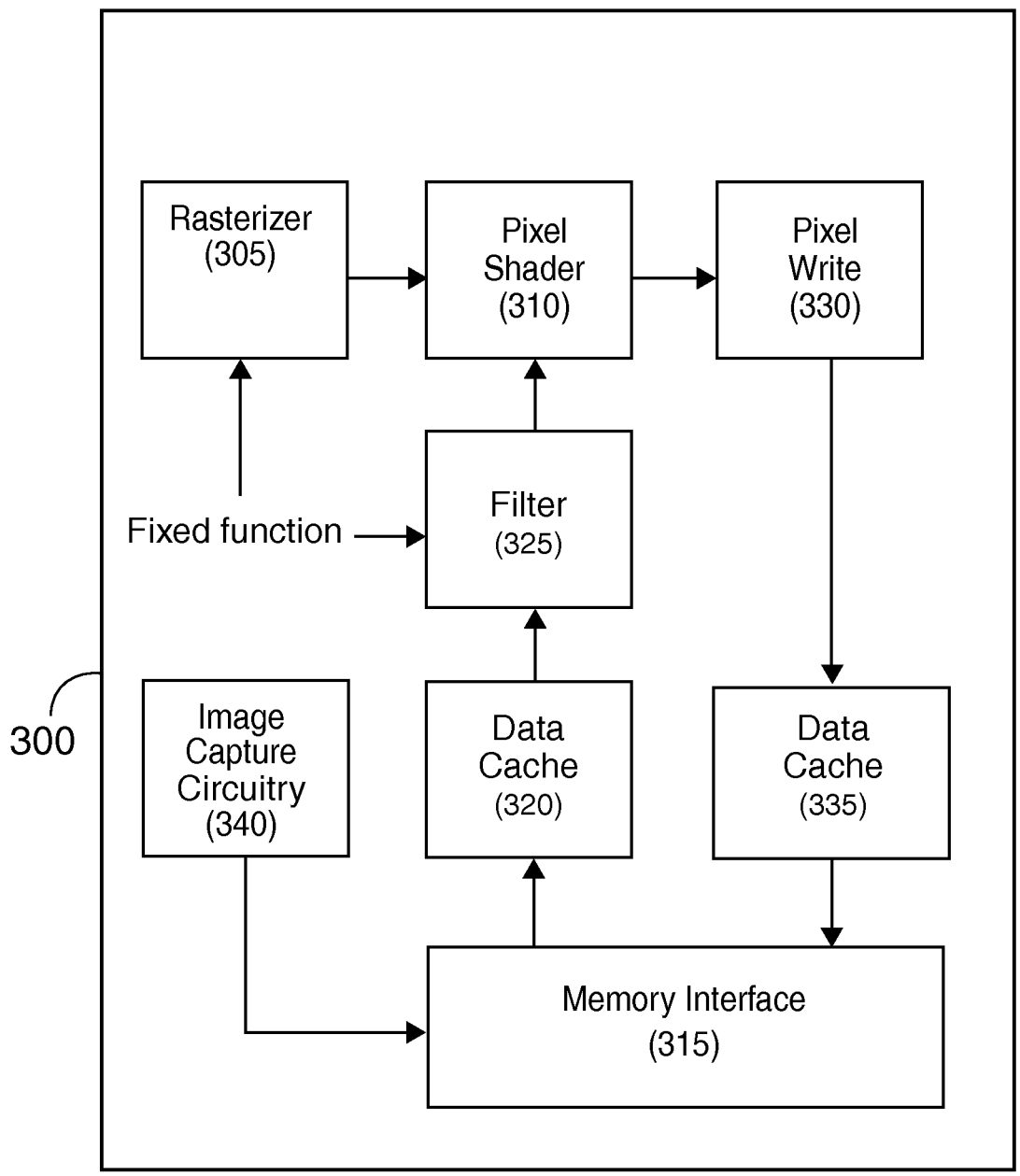
FIG. 4 is a block diagram illustrating another embodiment the image processing circuit of FIG. 2.

FIG. 4 is a block diagram illustrating another embodiment of the image processing circuit of FIG. 2. It should, however, be clear to those skilled in the art that the algorithms mentioned here may be implemented with a combination of fixed-function and programmable hardware, illustrated in FIG. 4. In this alternative embodiment, the image processing circuitry is implemented by programmable graphics processor 300 in which rasterizer 305 produces the coordinates of the output image and passes them to pixel shader 310 which calculates the pixels in the source image to be used, causes them to be read from memory 315 via data cache 320, and filtered by filter 325. The resulting pixels are transferred to pixel write unit 330, which writes them to memory 315 via data cache 335. In this embodiment, data from image capture circuit 340 is fed directly to memory 315, which is used to hold the resulting pixel data.

In another embodiment, the image processing circuit may be a combination of a digital signal processor and a graphics processor while the control circuit is implemented with a commonly available central processing unit (CPU) such as that found in personal computers. Those skilled in the art will recognize that these examples are indicative of possible implementations without being exhaustive. The image processing circuitry may be made of a number of digital signal processors, graphic processors, or application specific processors each with its own data and program memory.

Referring again to FIG. 2, image processing circuit 145 is under control of control circuit 150 that receives commands from the base station (not shown). These commands might typically include directions to pan, tilt, or zoom the view transmitted by camera 130, or it may indicate other actions such as the enabling of other algorithms including motion detection. In one embodiment, the control circuit may be implemented as part of the image processor. Image sensor 140 should be of sufficiently high resolution such that a section of the captured view may be extracted and transmitted to the base station. Changing the extracted section, referred to as the ROI, results in changes in the view presented to the base station. Moving the ROI has the effect of panning, making the ROI smaller gives the effect of increasing magnification, increasing the size of the region-of-interest has the effect of reducing magnification. The size of the image sensor determines the maximum magnification according to:

max horizontal magnification=horizontal resolution of sensor/horizontal resolution of transmitted view max vertical magnification vertical resolution of sensor/vertical resolution of transmitted view Hence an image sensor with a high resolution results in a larger maximum magnification. A standard video format might have a resolution of approximately 400,000 pixel, therefore if a 2,000,000 pixel sensor is used then there is an effective zoom of five times.

In situations where it is too costly to use a single, high-resolution sensor, it is possible to construct a high-resolution sensor from several low-resolution sensors. In this embodiment, the sensors are arranged such that one or several lenses focus the view upon them; the errors that occur where the sensors join are corrected by the same techniques as wide-angle distortion.

Output circuit 155 is optionally used to compress and format the output of image processing circuit 145. Compression is used to reduce the bandwidth needed to transmit the view to the base station. This is important, as the transmission medium is typically restricted in the bandwidth available. The compression may be a standard format such as MPEG4 or a proprietary format understood by the base station. Other methods of compression include reducing the frame rate or resolution of the video, wavelet or discrete cosine transform (DCT). Output circuit 155 is also responsible for formatting the video in a way suitable for reception by the base station. This might involve converting it to an analog signal such as RS 172 or maintaining it in a digital form and converting it to a network format such as Internet Protocol packets. In another embodiment, compression and formatting may be performed by image processing circuit 145. In one embodiment, output circuitry may provide a plurality of analog signals, such as PAL or NTSC, with different views of regions of interest. More than one output allows different views from the same camera to be displayed at a standard base station for better surveillance. However, in most applications, the output circuitry 155 will transmit a digital video image signal which may be formatted in data packets addressed to a network node (e.g., camera, base station, server, etc).

In order to implement the pan, tilt, and zoom commands from control circuit 150, image processing circuit 145 extracts the portion of the wide-angle image that is to be transmitted to the base station. The ROI may be the complete frame, or a portion of the frame. In either case, it is likely that the resolution of the extracted region (i.e. the number of pixels it contains) will not match the resolution expected by the base station, so image processing circuit 145 scales the region either up or down in resolution. This scaling may also be done as part of the image correction step mentioned earlier. In surveillance systems, it is normal to zoom the camera on ROIs where suspicious activity is noted. When zoomed in, a mechanical PTZ camera loses sight of other parts of the image. In contrast, the disclosed wide-angle camera can maintain visibility of the full scene available from lens 135 and this may be transmitted to the base station in addition to the zoomed ROI. The full scene may be embedded within the zoomed image as a thumbnail or small image enabling the operator to monitor other areas while inspecting suspicious activity. The wide-angle camera can incorporate the ability to transmit a thumbnail embedded within a larger frame.

The number of ROIs that can be simultaneously monitored is limited only by the processing power in the camera and the bandwidth constraints of the link to the base station. Transmission of ROIs need not be in the form of thumbnails and may instead be as interleaved fields or frames, or multiplexed in some other way dependent upon the nature of the link with the base station. The wide-angle camera is capable of capturing multiple views in which each view is transmitted to the base station as though from a distinct Internet Protocol addressed camera, and the views can likewise be designated by distinct Internet Protocol addresses.

The continuous capture of a wide-angle view avoids temporary blind-spots experienced by mechanical PTZ cameras when they zoom in on a specific area, which avoids missing movements that should cause an event alarm to be signaled. In one embodiment, storage 157 receives input from image processing circuit. Storage 157, for example a magnetic storage medium such as a disk drive, is added to the camera for the purpose of storing the previously captured wide-angle video, either compressed or uncompressed. This stored video may be transmitted to the base station when an event has been detected to provide context for the signaled event, the relevant views being extracted from the stored video in the same manner as from live video. Hence, event detection is more reliable in the disclosed inventions than in prior art.

Figure 5:
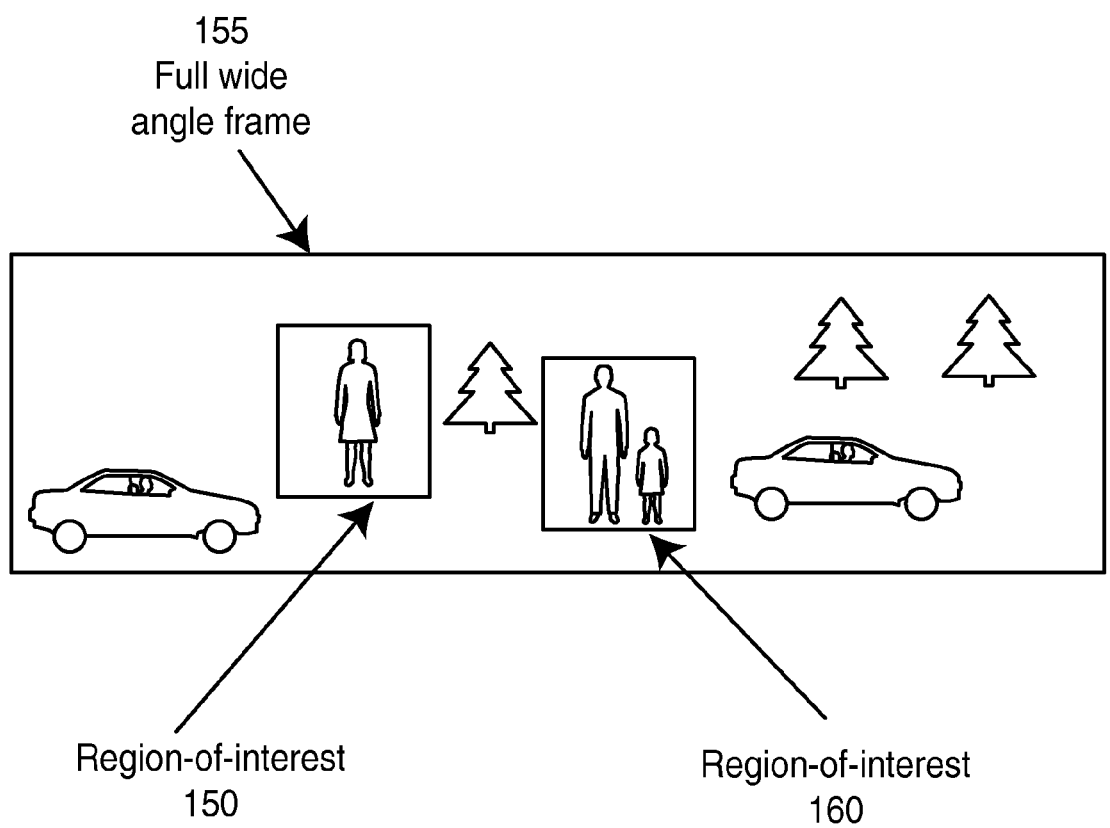
FIG. 5 is a picture illustrating the extraction of two regions of interest from a wide-angle view.

FIG. 5 illustrates the extraction of two regions of interest from a wide-angle view. FIG. 5 illustrates the extraction of first ROI 450 from wide-angle view 455 and the extraction of second ROI 460. Since the view transmitted to the base station is determined by the ROI extracted from the wide-angle image, the direction of view may be changed at high speed, limited only by the frame rate of the video. This is a major benefit over a mechanical PTZ camera, which may take several seconds to change its viewing direction as the camera is mechanically moved and positioned.

Figure 6:
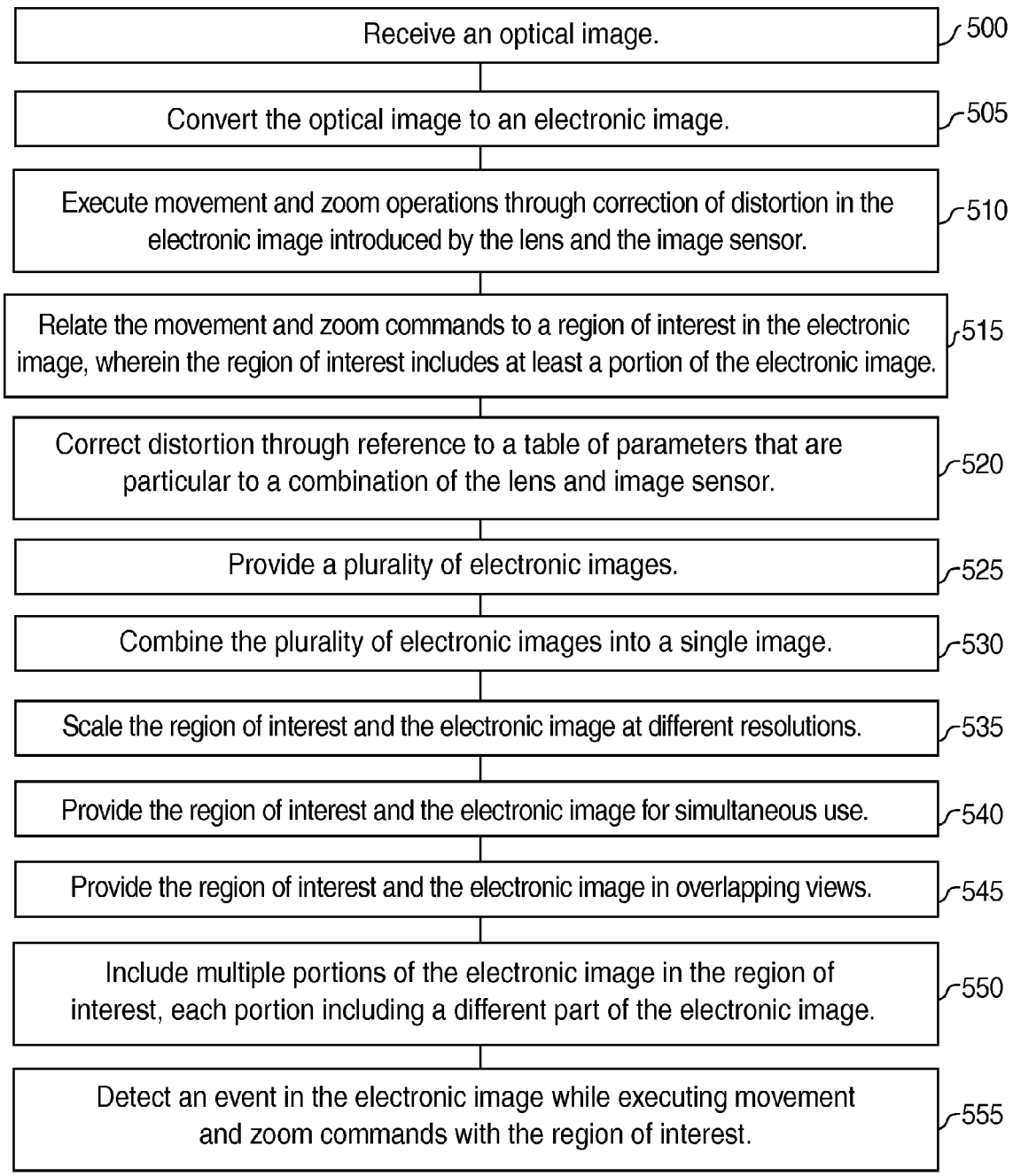
FIG. 6 is a flow chart illustrating a method of operating a video camera.

FIG. 6 is a flow chart illustrating a method of operating a video camera according to some embodiments. The video camera includes a lens, an image sensor coupled to the lens, and an image processing circuit coupled to the image sensor. In block 500, receive an optical image. In block 505, convert the optical image to an electrical image. In block 510, execute movement and zoom operations through correction of distortion in the electronic image introduced by the lens and image sensor. In block 515, relate the movement and zoom commands to a region of interest in the electronic image, wherein the region of interest includes at least a portion of the electronic image. In block 520, correct distortion through reference to a table of parameters that are particular to a combination of the lens and image sensor. In block 525, provide a plurality of electronic images. In block 530, combine the plurality of electronic images into a single image. In block 535, scale the region of interest and the electronic image at different resolutions. In block 540, provide the region of interest and the electronic image for simultaneous use. In block 545, provide the region of interest and the electronic image in overlapping views. In block 550, include multiple portions of the electronic image in the region of interest, each portion including a different part of the electronic image. In block 555, detect an event in the electronic image while executing movement and zoom commands with the region of interest.

In one embodiment, output circuitry may provide a plurality of analog signals, such as PAL or NTSC, with different views of ROIs. More than one output allows different views from the same camera to be displayed at a standard base station for better surveillance. If the system uses the Internet, the output circuitry transmits digital image data formatted into Internet Protocol (IP) transmission packets. The output circuitry can also output a digital video feed.

Figure 7:
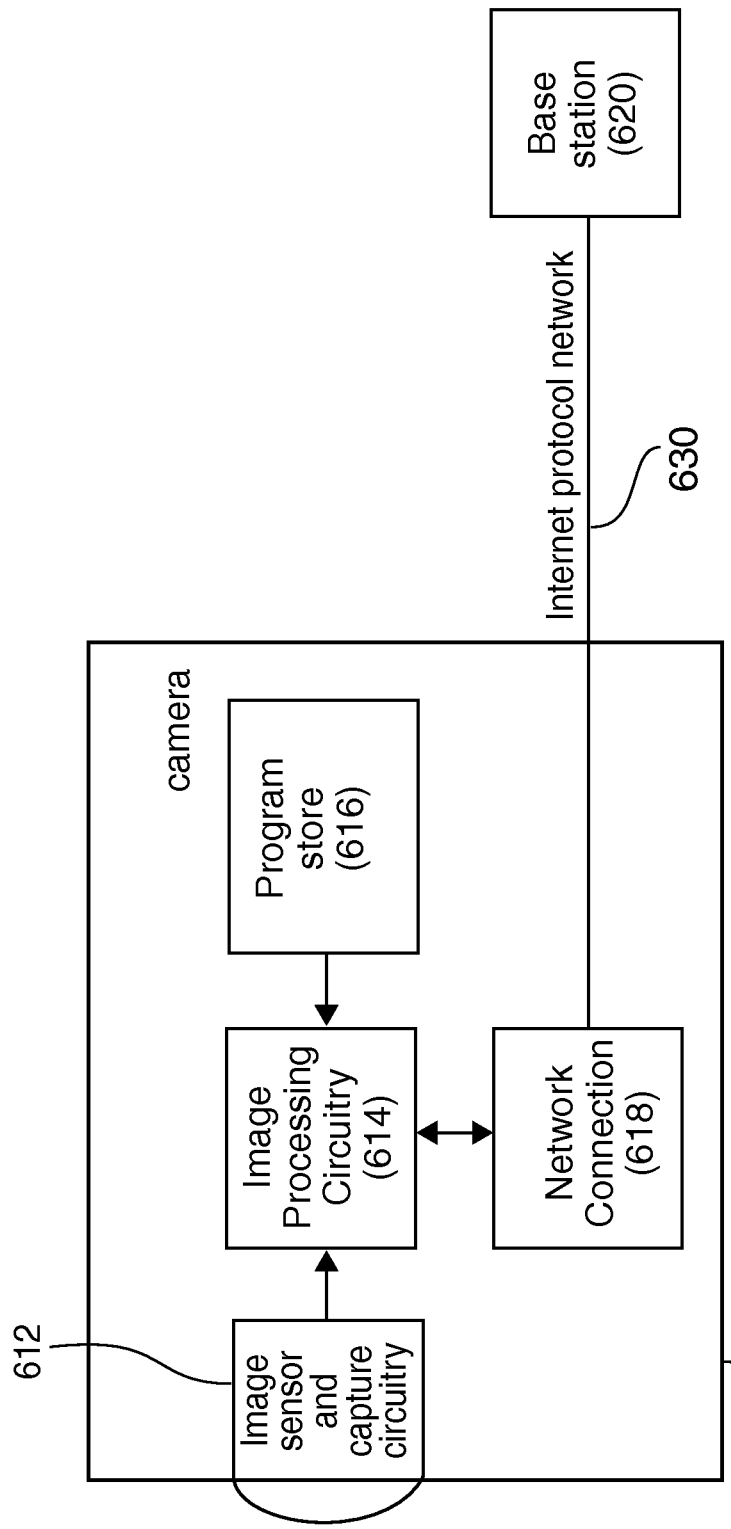
FIG. 7 is a block diagram illustrating one embodiment for a video camera with an Internet Protocol connection to a base station.

FIG. 7 is an embodiment of a video camera in accordance with the present inventions with an Internet Protocol connection. A wide-angle video camera 610 consists of an image sensor and circuitry 612 capturing a wide-angle view, an image processing circuit 614 which executes programs upon the captured image, a program store 616 to hold software programs for execution by the processing circuit, and a network connection 618 connecting the camera 610 to a base station 620 (or other camera) using an Internet Protocol network 630. In another embodiment, a memory is added for the storage of captured video. This captured video may be the full wide-angle frame, or ROIs within the frame, and may be as captured or after processing for correcting geometric distortions introduced by the optical system. When an event is detected, it may be useful to refer back to previous frames; for example, behavior analysis software may detect the actions of a pick-pocket, and then refer to previously captured video to find a good representation of the pick-pocket's face. Other processing algorithms may similarly find access to stored video data useful.

The network connection referred to in FIGS. 1 and 7 enables new programs to be loaded into the camera as necessary. It also facilitates the loading of data for use by processing software within the camera. This might include facial data used in face recognition software such that one or more cameras may be constantly searching for faces without transmitting any information to the base station until a possible match is found. In the same way, the camera may hold vehicle license plate data and only transmit information to the base station when a match is found.

In one embodiment, the camera may transmit the results of the in-camera processing to another camera to facilitate object tracking across discontinuous fields of view. If one camera determines that an object is suspicious and should be tracked, it may signal the position and trajectory to other cameras such that the object does not have to be re-acquired as it moves into the field of view of the other camera. Similarly, if a camera determines an event to be suspicious it may signal the position of this event to other cameras such that the other cameras may validate the first camera's analysis before the alarm to the base station is signaled. For example, in-camera processing may detect smoke within its field of view but request confirmation from other points of view before raising an alarm. In another example, in-camera processing may identify behavior as illegal but be unable to record the perpetrators face so the position may be sent to another camera which captures an image of the face.

The disclosed wide-angle camera can be capable of supplying multiple views of different areas under surveillance. In typical use, one view may represent a wide-angle view of the scene while another represents a close-up view of a ROI. In normal operation, these views, and similar views from other cameras, must be presented to an operator in a concise manner. This usually entails compositing the various views into a single view for display on a monitor. A useful example might be a close-up of a ROI filling most of the display and a smaller thumbnail wide-angle view to ensure that events in other areas are not missed.

Under different scenarios it may be better to perform this compositing in the camera or at the base station where the views are monitored. If the base station is not compatible with the cameras that can produce multiple views then it is necessary to perform all compositing in the camera. If the bandwidth between the camera and the base station is limited it may be beneficial to perform compositing in the camera in order to reduce the amount of data transmitted. If, however, more than one base station requests views from the same camera it may be possible to reduce the amount of data transmitted by broadcasting the same view to all base stations that have requested it. If a base station has requested views from more than one camera, then it is necessary that the base station composites the views, although each camera may be supplying composite views and the base station builds a composite of composites. In general, it is useful to be able to determine where compositing takes place moment by moment.

Figure 8:
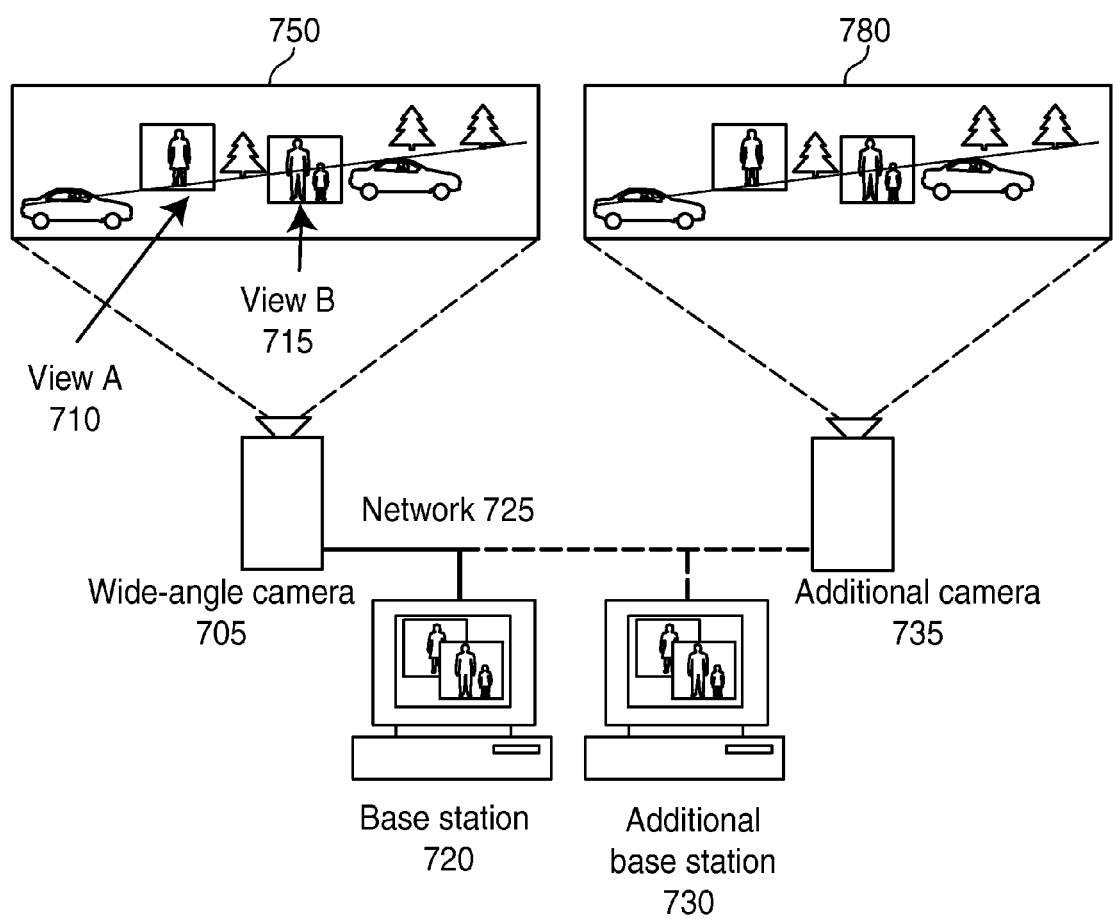
FIG. 8 illustrates compositing several views from a plurality of wide-angle cameras.

FIG. 8 illustrates compositing several views from a plurality of wide-angle cameras. A wide-angle camera 705 captures a scene and extracts several views, View A 710, View B 715, and View 750. The camera 705 scales the views as necessary, optionally composites the views into a one or more frames and transmits them to the base station 720. At the base station 720, separate views or frames may be composited to present a single frame to the operator. If more then one base station is present on the network 725, the camera 720 may be tasked to supply the same or different views to each base station 720 and 730. If more then camera 705 is present on the network 725, a base station 720 or 730 may request views from both camera 720 and 730. The captured views 750 and 760 in this embodiment, but one skilled in the art will recognize that the Views 750 and 760 can be adjacent views, overlapping views, different perspective views, or even unrelated views of different areas. The composite views from the cameras 720 or 730 may be made output in a standard analog or digital format for monitoring on a standard video monitor at base station 720, 730, or both.

Figure 9:
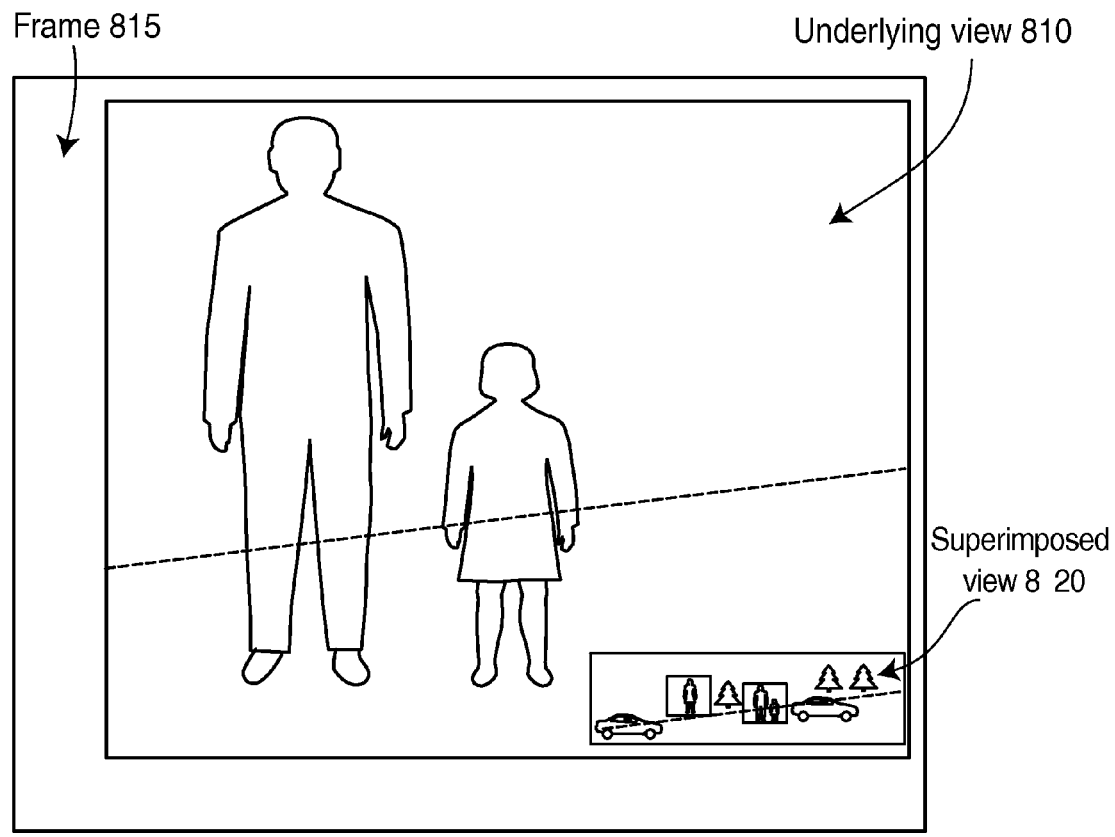
FIG. 9 illustrates a first embodiment of compositing a view and a ROI.
Figure 10:
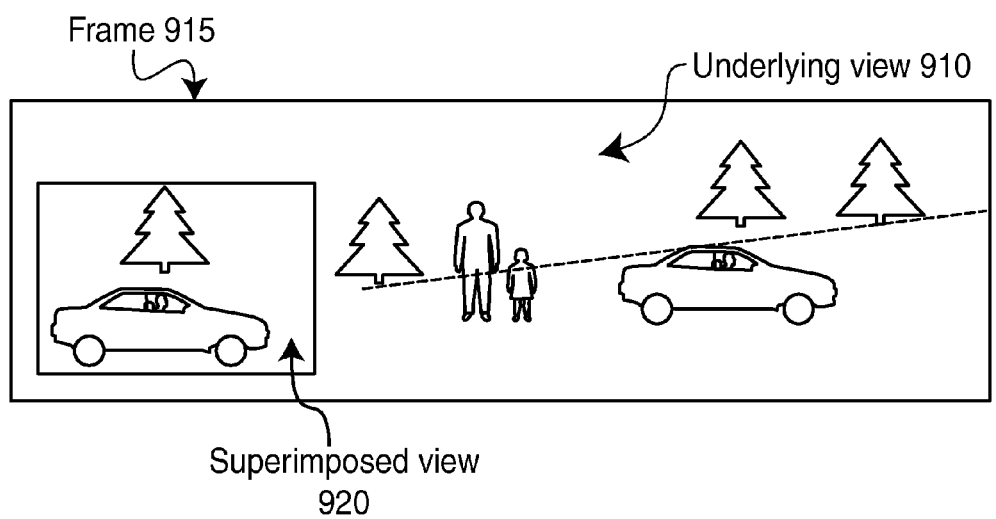
FIG. 10 illustrates a second embodiment of compositing a view and a ROI.
Figure 11:
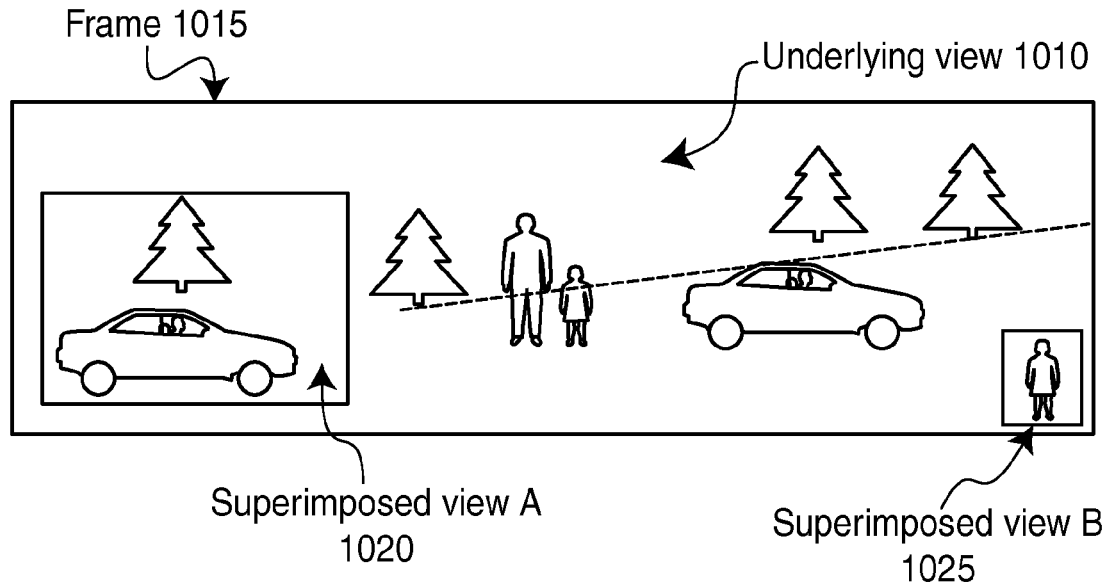
FIG. 11 illustrates a third embodiment of compositing a view and two ROIs.
Figure 12:
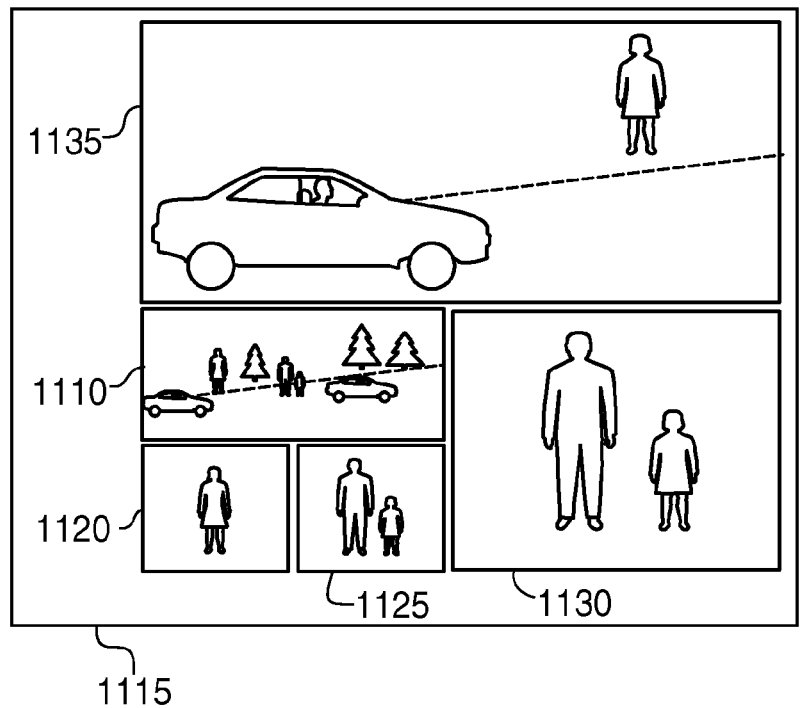
FIG. 12 illustrates a fourth embodiment of compositing a view and multiple ROIs.

In one embodiment shown in FIG. 9, a close-up view, the underlying view 810, may fill the whole frame 815 other than a small region occupied by a thumbnail holding the wide-angle view, the superimposed view 820. In another embodiment shown in FIG. 10, the underlying view 905 is a wide-angle view filling most of the frame 915 and the close-up superimposed view 920 occupies a larger proportion of the frame 915. In yet another embodiment shown in FIG. 11, there may be several superimposed views 1020 and 1025 over an underlying wide-angle view 1010 within the same frame 1015. In this embodiment, the superimposed views are scaled differently, with view 1025 occupying a small portion of the frame 1015 as a thumbnail image, and view 1020 occupying a larger portion of the frame 1015. In a further embodiment shown in FIG. 12, the distinct views may not overlap one another and so no part of any view is obscured. The frame 1115 includes a wide-angle view 1110 and several adjacent close-up views 1120, 1125, 1130, and 1135, which can be scaled to different sizes as shown.

Those skilled in the art will understand that the size of the various views may be varied as may their quantity, position, and size within the frame, and that these parameters may be varied under control of the base station or by the camera itself. In particular, the position may be varied to prevent the thumbnail or superimposed view from obscuring ROIs within the underlying view. Additionally, the views can be arranged as tiled, overlapping, or partially overlapping views. In an alternative embodiment, each of the above arrangements or a single view filling a frame may be alternated in time, the time between alternate arrangements to be determined by the base station or the camera.

Figure 13:
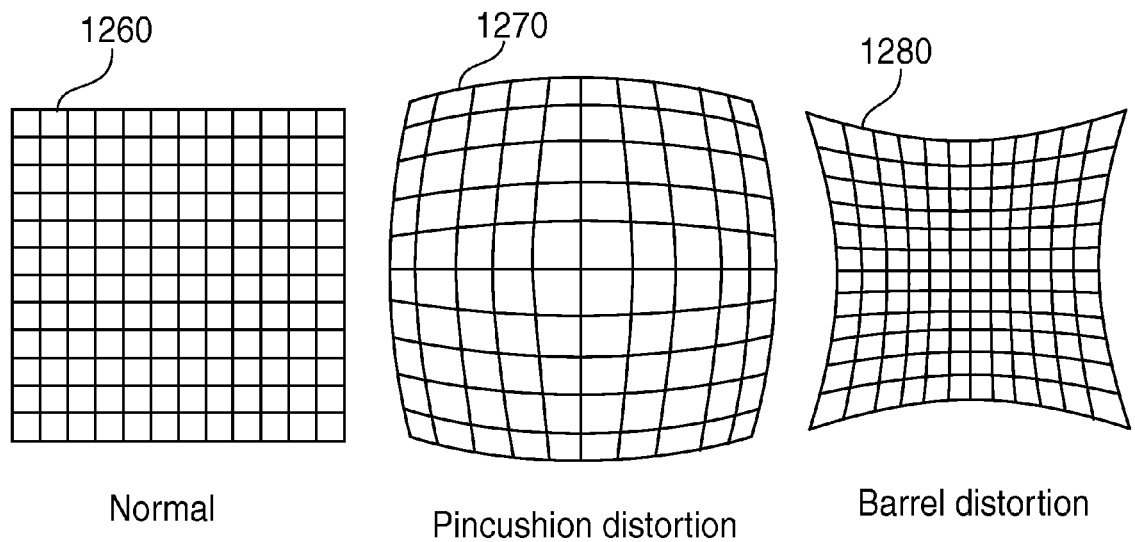
FIG. 13 is a diagram illustrating normal, pincushion distortion and barrel distortion patterns.

The wide-angle camera operates by electronically correcting distortion by image data processing. FIG. 13 is a diagram illustrating normal, pincushion distortion and barrel distortion patterns. The type of distortion corrected by the inventions is termed geometric distortion caused by different areas of the optical system having different focal lengths and different magnifications. This is characterised by the warping of horizontal or vertical lines. Pattern 1260 illustrates a square grid pattern, pattern 1270 illustrates one example of a square grid pattern subject to pincushion distortion, and pattern 1280 illustrates one example of a square grid pattern subject to barrel distortion. Distortion may be introduced into the optical system through manufacturing processes or intentionally in order to alter or enhance the field of view. The wide-angle camera corrects pincushion and barrel distortion as well as distortion that may be reduced by a compensating geometric distortion, including that introduced by a fish-eye lens. The image processing circuitry captures the nature of this distortion and uses image data processing techniques to correct it.

The distortion is corrected by reference to a held in a solid-state memory that indicates the mapping between pixels (i.e., picture elements, an individual dot in the image) of the distorted image and pixels of the corrected image. This mapping table may be constructed for each optical system or batch of systems produced, hence removing the need for high accuracy components. The mapping table may be specific to a particular lens/image sensor combination, a type of lens or a type of image sensor, and so on. Additionally, the mapping table may be stored within the lens in a memory and loaded into the camera upon attachment of the lens to the camera.

Figure 14:
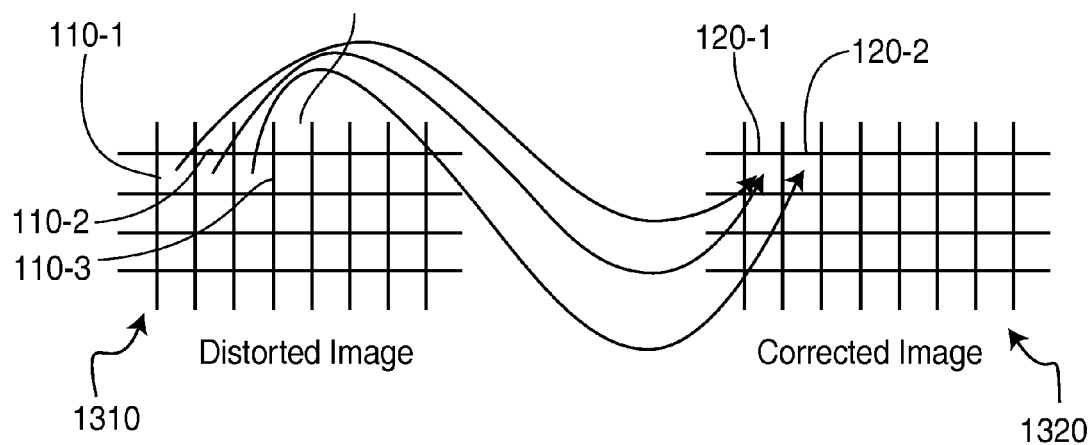
FIG. 14 is a diagram illustrating a graphical version of a forward mapping table.
Figure 15:
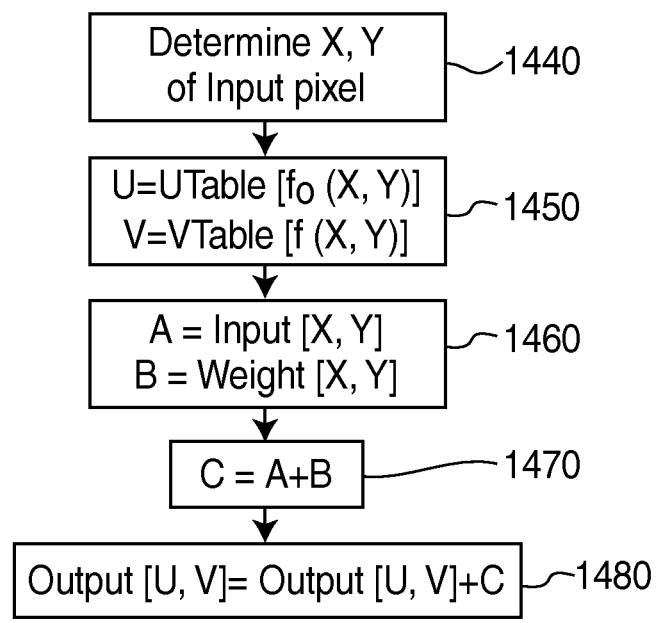
FIG. 15 is a block diagram illustrating a method for producing a corrected pixel with a forward table.

The table is typically one of two types: it may be a forward table in which the mapping from distorted image to correct image is held (see FIG. 14), or it may be a reverse table holding the mapping from corrected image to distorted image (see FIG. 15). FIG. 14 is a diagram illustrating a graphical version of a forward mapping table. Every pixel in distorted image 1310 may be mapped to corrected image 1320 using the forward mapping table, and each entry may result in the mapping of a pixel in the distorted image to zero, one, or several pixels in corrected image 1320. For example, both pixels 110-1 and 110-2 map to pixel 120-1, while pixel 110-3 maps to 120-2. Many other combinations are possible. The table may also hold weight values indicating the proportion of the distorted pixel value to be used in the corrected image; if the distorted pixels are added to the corrected pixel (which had initially been set to zero) then these weights implement filtering which reduces artifacts of the image warping being performed.

FIG. 15 is a block diagram illustrating a method for producing a corrected pixel with a forward table. In block 1440, determine the X Y coordinates of the input pixel. In block 1450, generate output coordinates U and V using functions $f_o$ and $f$, and the results used as indices into forward mapping tables UTable and Vtable, generating output coordinates (U,V). In block 1460, calculate A and B, where B is the weight to apply to A. In block 1470, calculate C, or the weighted value of pixel at coordinates X,Y. In block 1480, calculate the output pixel value, Output [U,V], by modifying with the weight of the input pixel.

Figure 16:
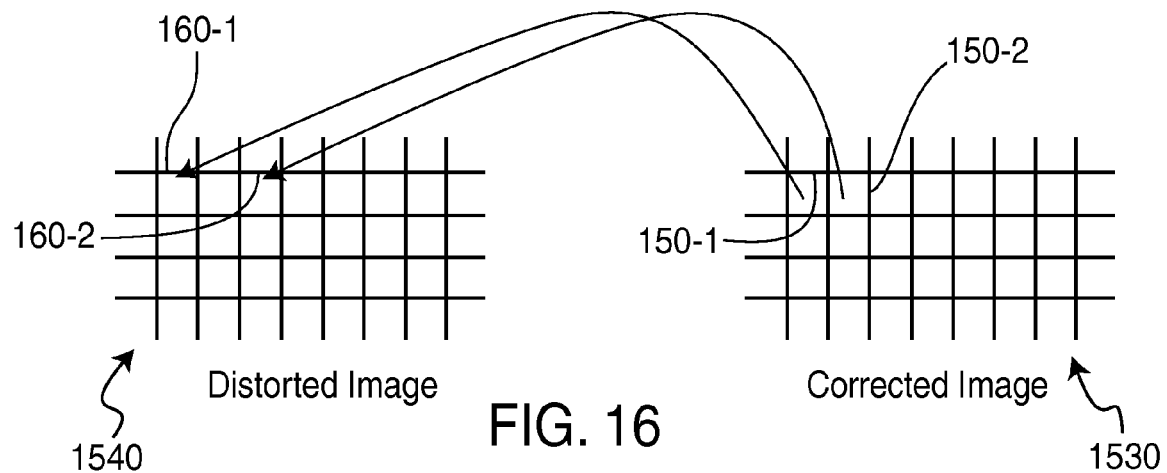
FIG. 16 is a diagram illustrating a graphical version of a reverse mapping table.

FIG. 16 is a diagram illustrating a graphical version of a reverse mapping table. If the table holds a reverse mapping, every pixel in corrected image 1530 can be mapped to one or more pixels in distorted image 1540. Although a one-to-one pixel mapping is sufficient to obtain a complete corrected image, increasing the number of pixels mapped in conjunction with filter weights for each of the mappings can improve the quality of the result. For example, pixel 150-1 maps to pixel 160-1, while adjacent pixel 150-2 maps to non-adjacent pixel 160-2. A simpler though lower quality method of filtering involves limiting the table to a one-to-one mapping but additionally using distorted pixels adjacent to the one specified in the table as input to a filter.

Figure 17:
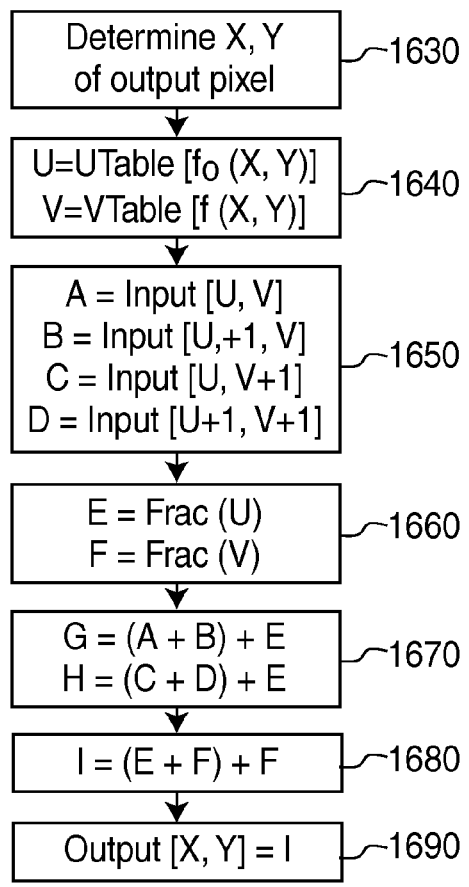
FIG. 17 is a block diagram illustrating a method for producing a corrected pixel with a reverse table.

FIG. 17 is a block diagram illustrating a method for producing a corrected pixel with a reverse table, using a bilinear interpolation to generate the output value. Similar steps can be taken to perform more sophisticated interpolation, for example, bicubic interpolation. In block 1630, determine the X,Y coordinates of the input pixel. In block 1640, generate output coordinates U and V using functions $f_o$ and $f$, and the results used as indices into forward mapping tables UTable and Vtable, generating output coordinates (U,V). In block 1650, calculate A, B, C, and D. In block 1660, calculate E and F, or the weights of U and V, respectively. In block 1670, calculate G and H. In block 1680, calculate I. In block 1690, calculate the output pixel value.

Referring again to FIG. 16, for either table it is also possible to filter the corrected image after it has been completed, though this may affect quality. A possible implementation of filtering would use the equation:

$$\text{value} = (\text{weight}_a * \text{pixel}_a) + (\text{weight}_b * \text{pixel}_b) + \text{weight}_c * \text{pixel}_c)$$

which is a weighted sum of selected pixels.

Figure 18:
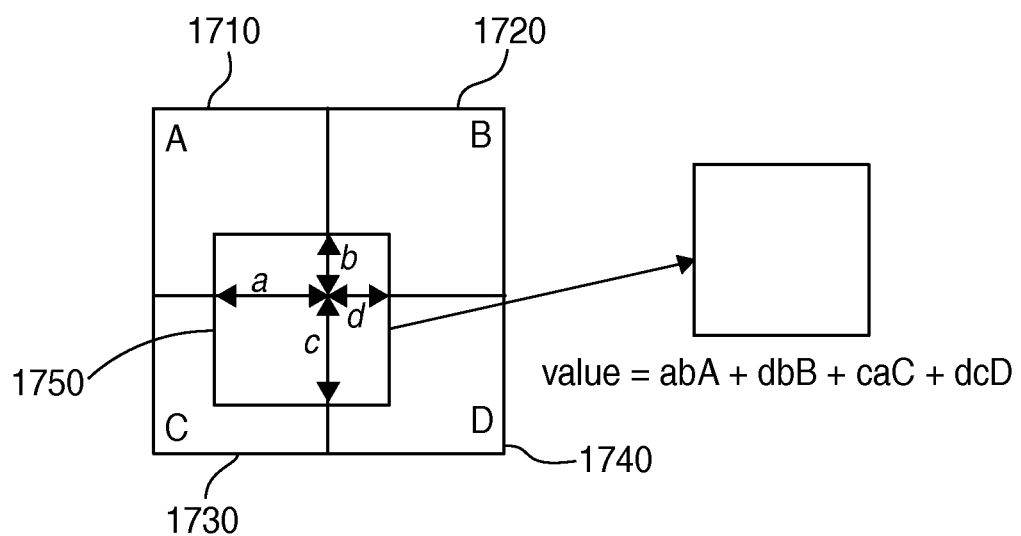
FIG. 18 is a diagram illustrating one example of weighting using a filter.

FIG. 18 is a diagram illustrating a graphical version of the above equation. The weights may be pre-calculated and held in the table and might be simply based on the number of distorted pixels that are used to form the correct pixel, or might be based on the area of the correct pixel that each distorted pixel contributes (this may not be constant due to edge effects where one distorted pixel contributes to more than correct pixel). For example, pixel 1710 is weighted with value "A," pixel 1720 is weighted with value "B," pixel 1730 is weighted with value "C," pixel 1740 is weighted with value "D." A part of each of pixels 1710, 1720, 1730, and 1740 make up pixel 1750, whose value is calculated by computing an area in each of the known pixels and multiplying the area by the weight of the respective pixel. The area in pixel 1710 is a*b, the area in pixel 1720 is b*d, the area in pixel 1730 is a*c, while the area in pixel 1740 is d*c. The value of pixel 1750 is the sum of the weighted areas of each underlying pixel. Therefore, the value of pixel 1750=a*b*A+b*d*B+c*a*C+d*e*D.

The contents of either the forward or reverse mapping tables may be generated automatically by directing the camera at a test pattern, typically a grid of black lines on a white background. With knowledge about the viewing conditions and relative positions of camera and test pattern, it is straightforward to determine corresponding intersections of horizontal and vertical lines on the test pattern and the distorted image. When the correspondence is known, a mapping table is simple to construct and in the context of a production line this may be done automatically. If the camera is deployed, however, aging effects or damage may result in a need to recalculate the tables. As it may be difficult to construct good conditions for automatic calibration, it may be necessary to resort to manual calibration in which a service engineer or similar adjusts the correction table until the displayed result is within a required tolerance. To achieve manual calibration, it is useful to be able to attach a test card to the camera such that it is in a known position and the camera housing may have attachment points to facilitate this. It is also possible that automatic calibration is applied first, followed by manual adjustment, and this is referred to as semi-automatic calibration. Note that the camera may provide some assistance in this procedure by performing operations such as edge enhancement to make the test pattern more easily visible. Alternatively, if the distortion of the optical system is well understood the mapping tables may be generated analytically.

Only those pixels that lie on the marked points of the test pattern have a known mapping, so a test pattern with more points will produce more accurate results. Those pixels which do not have a known mapping may use an interpolated mapping derived by inspecting the mapping of neighboring pixels and estimating a new mapping. The estimation may be done by linear interpolation or a higher-order interpolation as desired. It is possible that this estimation is performed within the camera instead of as part of the table generation. In this case, the table may not hold as many entries as previously disclosed, which would have the benefit of reducing the amount of memory needed to hold it. It would, however, increase the computation needed to correct the distorted image by requiring interpolation of intermediate mappings. The opportunity to balance processing power and memory requirements is a useful benefit of the algorithm presented here.

Figure 19:
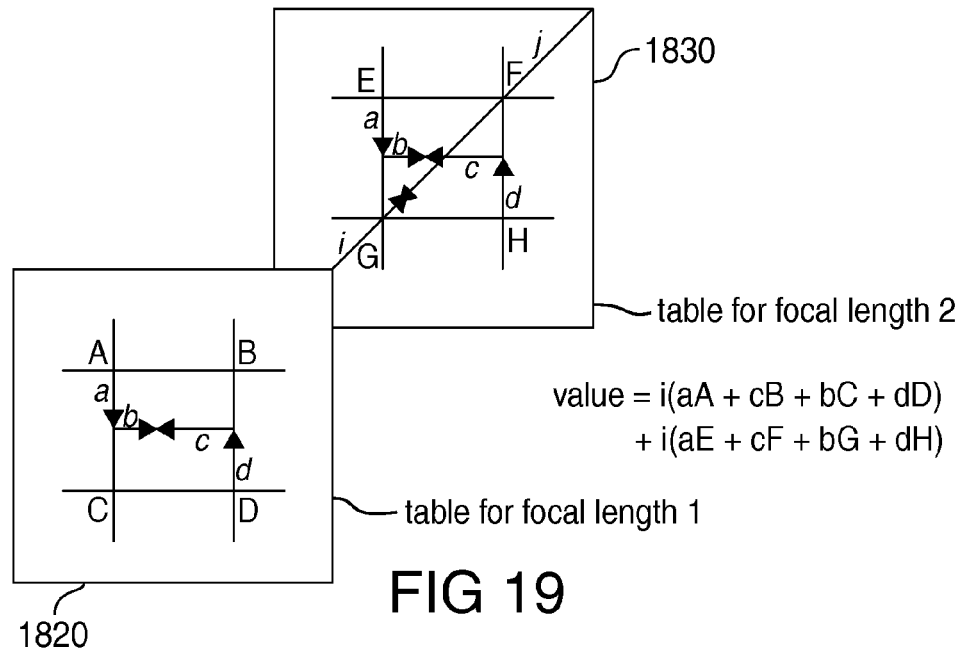
FIG. 19 is a diagram illustrating two tables for interpolating missing entries in three dimensions.

A different mapping table may be constructed for each aperture setting of the optical system if changing the aperture significantly changes the characteristics of the distortion. If the optical system has a variable focal length (e.g. it is a zoom lens) it may be appropriate to generate different mapping table for different focal lengths. FIG. 19 is a diagram illustrating two tables for interpolating missing entries in three dimensions. While the number of apertures is limited and it is possible to construct a table for each, the focal length is usually continuously variable so it is possible that the exact table required will not be available. If tables are constructed for a limited selection of focal lengths then they may be considered to form a lattice and missing entries interpolated in three dimensions. The image processing circuit within the camera may perform the interpolation when it is informed of the setting of lens either automatically or by the user.

For example, table 1820 represents a mapping at one focal length while table 1830 represents a mapping at another focal length, with "i" the distance from the first focal length and "j" the distance from the second focal length, wherein the point at which "i" and "j" meet is the desired focal length. One point of interest is between points A, B, C, and D of table 1820. In order to interpolate between the two tables, value "a" of table 1820 is multiplied by A and added to value "b" multiplied to C and added to value "c" multiplied to B and added to value "d" multiplied to D. For table 1830, value "a" is multiplied by E and added to value "b" multiplied to G and added to value "c" multiplied to F and added to value "d" multiplied to H. The sum of values for table 1820 is then multiplied by "i" and added to the product of table 1830 and "j," for an interpolated value.

In another embodiment, the projection of the image onto the sensor may be adjusted, for example to improve resolution in selected area. As the image projection is adjusted a different table may be used to correct the distortion.

In general, any number of tables may be used to correct any geometric distortion that varies as a function of some parameter of the system. A separate and distinct mapping table or set of mapping tables may be determined for several different optical systems and held in the camera. The camera may automatically determine the type of optical system in use and the appropriate table used. Alternatively, the table may be held in solid-state memory attached to the optical system such that each optical system presents a set of correction tables to the image processing circuit on attachment to the camera.

Figure 20:
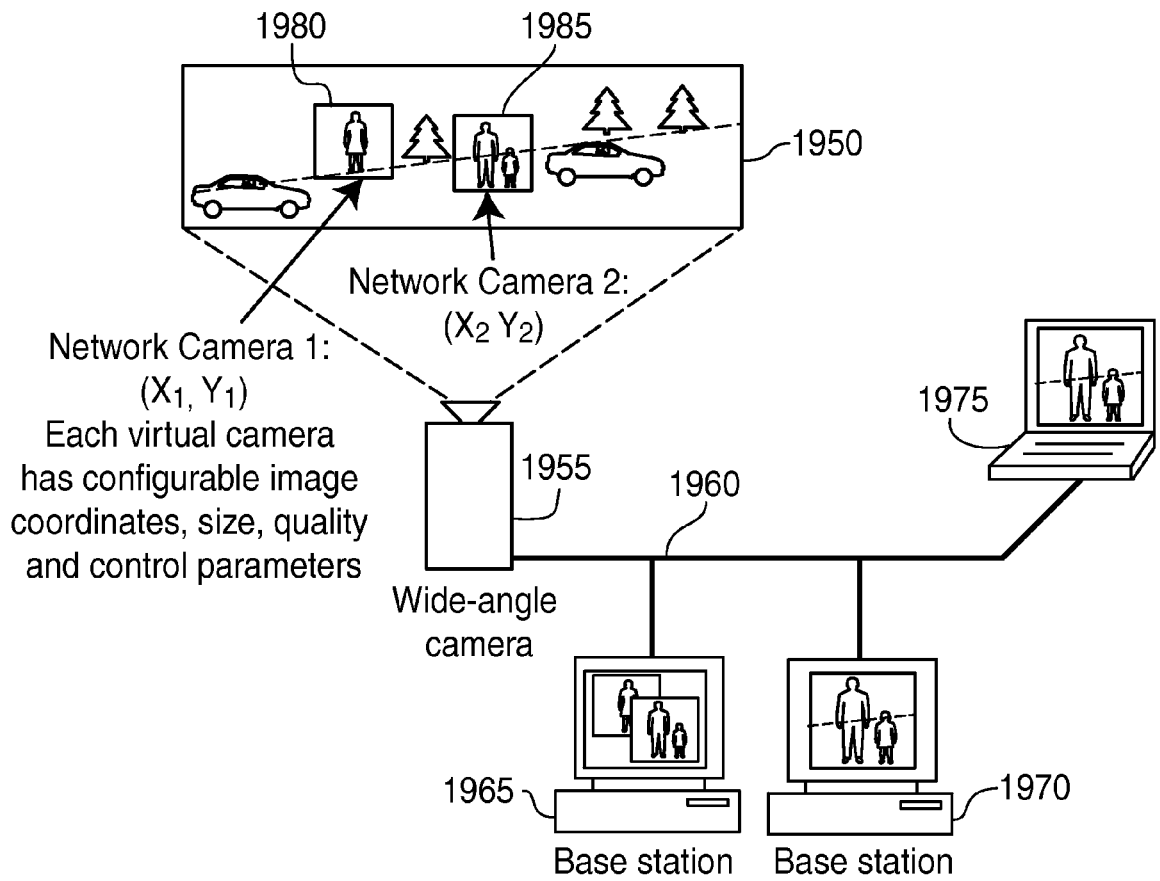
FIG. 20 is a diagram illustrating one embodiment of an IP-based network surveillance system of the inventions.

FIG. 20 illustrates one embodiment of the invention where the use of multiple Internet Protocol (IP) addresses by a single camera appears to originate from more than one camera. Several views of the scene 1950 captured by video camera 1955 are transmitted across network 1960 to receiving base stations 1965, 1970 and 1975. Video camera 1955 is capable of capturing more than one channel of video and audio data, including for example a video camera with a wide-angle lens. View 1980 has a separate IP address from view 1985 and as such is indistinguishable from the data that would be presented by a number of separate cameras. As many systems used for video surveillance or remote inspection include the capability to receive data from multiple IP video cameras, the invention allows existing systems to make use of new multiple view cameras.

View 1980, with coordinates $(X_1, Y_1)$, is transmitted to, for example, base station 1965. View 1985, with coordinates $(X_2, Y_2)$, is transmitted to base stations 1965, 1970 and 1975. Views 1980 and 1985 can be considered separate virtual cameras, with configurable image coordinates, size, quality and control parameters, and each assigned a separate IP address. View 1950 likewise can be treated as a separate virtual camera. Each virtual camera can be separately controlled to emulate PTZ cameras using its unique IP address.

Figure 21:
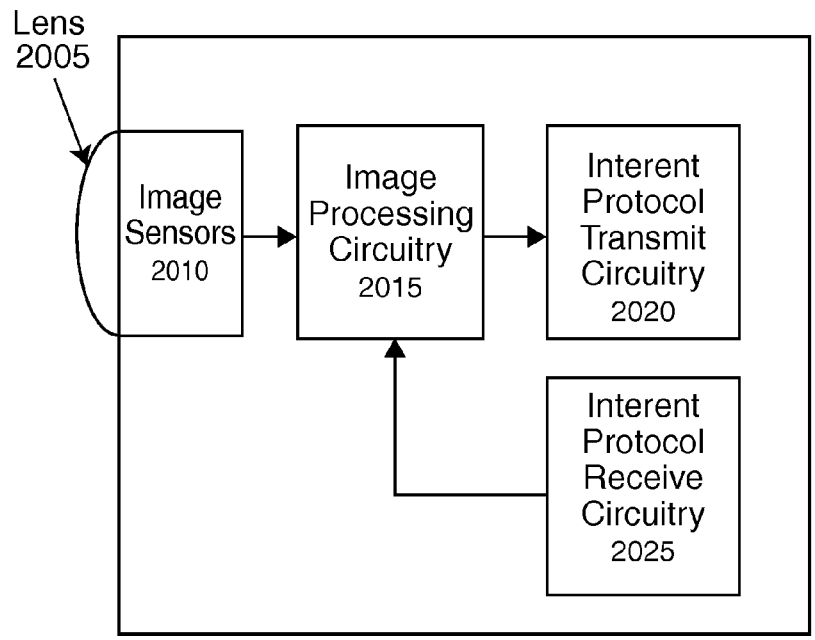
FIG. 21 is a block diagram illustrating one embodiment of the video camera from FIG. 20.

FIG. 21 illustrates one embodiment of a wide-angle IP video camera. Video camera 2000 includes optical and imaging system 2005, for example a wide-angle lens, conveying an image-to-image sensor 2010. Image processing circuit 2015 converts the video and audio data into packets suitable for transmission over a network. Transmitting circuit 2020 sends the packets over the network with a different transmitting IP address for each view. Receiving circuit 2025 receives control information marked with Internet Protocol addresses that correspond to those used to transmit the video and audio packets. Control information typically contains camera control commands. The information received by receiving circuit 2025 may include the coordinates of the ROI within the wide-angle field of view, exposure and color compensation controls, sharpness, control over compression, instructions to execute motion detection, or other algorithms. It should be clear to those skilled in the art that each of these circuits may be combined one with another in different combinations to reduce the cost of a particular embodiment.

Figure 22:
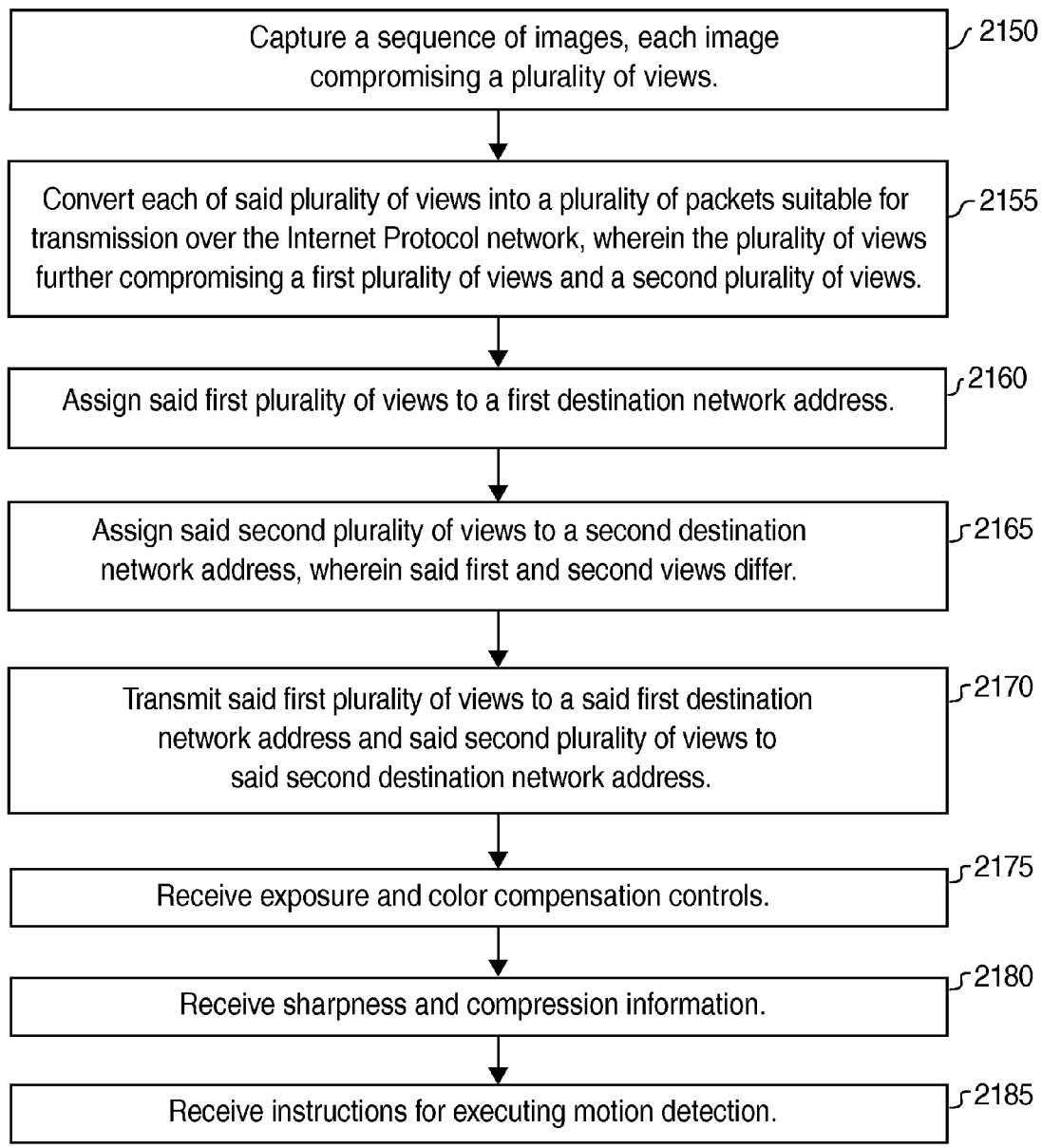
FIG. 22 is a flow diagram illustrating one method of transmitting a plurality of views from a video camera.

FIG. 22 is a flow chart illustrating a method of transmitting a plurality of views from a video camera. In block 2150, capture a sequence of images, each image comprising a plurality of views. In block 2155, convert each of the plurality of views into a plurality of packets suitable for transmission over an Internet Protocol network, wherein the plurality of views further comprises a first plurality of views and a second plurality of views. In block 2160, assign the first plurality of views to a first destination network address. In block 2165, assign the second plurality of views to a second destination network address, wherein the first and second views differ. In block 2170, transmit the first plurality of views to the first destination network address and the second plurality of views to the second destination network address. In block 2175, receive exposure and color compensation controls. In block 2180, receive sharpness and compression information. In block 2185, receive instructions for executing motion detection.

Figure 23:
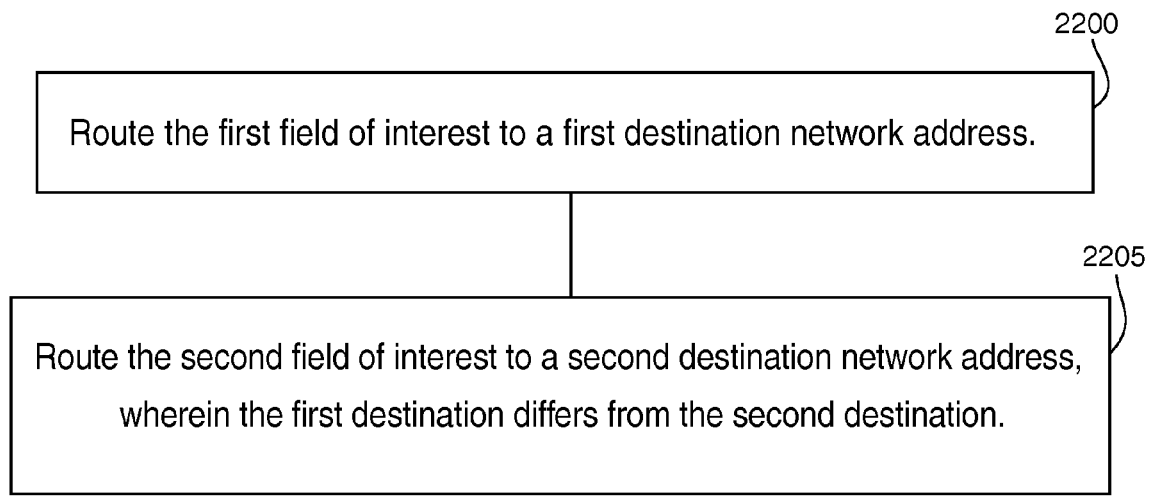
FIG. 23 is a flow diagram illustrating one method of transmitting a plurality of views over a network from a video camera.

FIG. 23 is a method of transmitting a plurality of views over a network from a video camera. The video camera includes a wide-angle lens configured to receive an optical image, an image sensor coupled to the lens and configured to convert the optical image to an electronic image, and an image processing circuit coupled to the image sensor and configured to receive the electronic image and to assign a first field of interest (e.g., a ROI) to a first portion of the electronic image, and to assign a second field of interest to a second portion of the electronic image, wherein the first portion of the electronic image differs from the second portion of the electronic image (e.g., separate virtual camera views). In block 2200, route the first field of interest to a first destination network address. In block 2205, route the second field of interest to a second destination network address, wherein the first destination differs from the second destination.

The foregoing has described methods for the correction of optical lens distortion by an image processing circuit within a camera that are given for illustration and not for limitation and uses of an electronic wide-angle camera. Thus the inventions are limited only by the appended claims. Although the inventions has been described in accordance with the embodiments shown, one of ordinary skill in the art will readily recognize that there could be variations to the embodiments and those variations would be within the spirit and scope of the present inventions. Accordingly, many modifications may be made by one of ordinary skill in the art without departing from the spirit and scope of the appended claims.

According to various embodiments, there is provided: Methods and systems of transmitting a plurality of views from a video camera. The camera captures a plurality of views from the camera and scales the view to a specified size. The camera composites at least a portion of the plurality of views into one or more views within the camera, and then transmits one or more of the views from the video camera to a base station for compositing views from the camera into a single view within the base station.

According to various embodiments, there is provided: A method of transmitting a plurality of views from a video camera comprising: (a) capturing a scene in a wide-angle video camera and extracting at least two views of a possible plurality of views; (b) scaling the plurality of extracted views to independently and respectively specified sizes, where each view is a geometry corrected wide-angle view of a region of interest selectively extracted from one of a plurality of places within the wide-angle view, each independently scaled and each corresponding to an independently controlled virtual camera; (c) compositing at least a portion of the plurality of views into one or more views to form a composite video which includes multiple different views according to step (b) selectively superimposed, adjacent, or tiled, which can include selecting at least one region of interest from within the wide-angle view; (d) whereby a compositing of superimposed, adjacent, or tiled views can be accomplished by the camera, or by a base station using a plurality of composited views, wherein the base station supports a surveillance monitor able to display the at least two views simultaneously, superimposed, adjacent, or tiled, and individually scaled as selected, and selectively positioned in the framed view of the monitor.

According to various embodiments, there is provided: A digital video camera system, comprising: at least one video camera capturing a geometry distorted view of using a wide-angle lens; digitally selectively extracted multiple region of interest views, each corresponding to a different implemented virtual camera centered on a different portion of the scene, and digitally processing image data of the views to composite into separate frame images, each individually scaled to a specified size, and correct the geometry of the captured scene and extracted images, and transmit the corrected view and images in a digital signal; and selectively displayed multiple corrected extracted images corresponding to multiple virtual cameras, and the scene from multiple video cameras, as selectively superimposed, adjacent, or tiled images, and able to composite selected images and scenes from different video and virtual cameras for display; whereby all the captured scene image data is viewable simultaneously with the extracted views on a surveillance monitoring display.

According to various embodiments, there is provided: A video camera system, comprising: at least one video camera capturing a geometry distorted view of using a wide-angle lens; selectively extracted multiple views centered on multiple points in the scene and electronically processing the view data to composite into separate frame images, each view image data set independently scaled to a specified size from a different implemented virtual pan-tilt-zoom camera; wherein corrected captured scene image data is viewable simultaneously with the corrected extracted views as selectively superimposed, tiled, or adjacent images that can simultaneously include images and scenes from different wide-angle video cameras.

According to various embodiments, there is provided: A digital camera reducing optical distortion from an optical system comprising: a) a wide-angle lens system mounted on a digital camera possessing internal image processing circuitry; b) an image sensor which captures a sensed image covering a wide-angle view; c) the image processing circuitry reducing optical distortions from the combination of the wide-angle lens system and the image sensor, wherein the reducing includes reference to a table of parameters specific to the particular wide-angle lens system and the image sensor combination held in a solid-state memory; and d) wherein the table maps an individual pixel of a corrected output image to an accurate coordinate in the captured sensed image, wherein pixel values within a local neighborhood of the sensed image are used to provide a weighted sum in an estimate of the value at the accurate coordinate on the sensed image; e) wherein the weight assigned each pixel within the local neighborhood is determined by its distance from the accurate coordinate provided by the table According to various embodiments, there is provided: A camera with adjustable image projection distortion correction comprising: a) a fixed wide-angle optical lens system coupled to an image sensor and circuitry converting the output of the image sensor to a digital data set suitable for use by an image processing circuit; b) the image processing circuit correcting optical distortions, where the correction includes using multiple distortion parameters to correct optical distortion that vary; c) a memory storing multiple parameters automatically selected to correct the optical distortions and interpolate parameters from the stored parameters if required; d) the multiple parameters used for correction held in a memory within the housing of the lens system or internal to the camera; and e) an individual pixel created using a weighted sum of a selected group of pixels to be used in the correction, wherein the weight of each pixel of the group of pixels is determined by its distance from the individual pixel based on their relative coordinates derived from the distortion parameter correction.

According to various embodiments, there is provided: A camera with reduced optical distortion comprising: a) a optical lens system capturing an ultra-wide field of view; b) an image sensor and circuitry converting the ultra-wide field of view to a digital data signal suitable for use by an image processing circuit; c) the image processing circuit configured to reduce optical distortions introduced by the combination of the optical lens system and the image sensor where the reducing includes reference to a table of parameters; d) the table of parameters stored in a solid-state memory; e) wherein the table maps an individual pixel of a corrected image to an accurate coordinate in a captured image, wherein pixel values within a selected group are in a local neighborhood and are used to provide a weighted sum estimate of the value at the accurate coordinate on the sensed image.

According to various embodiments, there is provided: A method of reducing geometric distortion in an optical system comprising: a) automatically defining a mapping between a distorted captured image of a test pattern and an undistorted test pattern; b) constructing a table of mapping information in a form suitable for use by an image processing in either a forward or reverse mapping; and c) using the image-processing circuit to apply the table to images subsequently or previously captured through the optical system.

According to various embodiments, there is provided: A video camera comprising: a wide-angle camera system configured to generate a digital video image using a lens providing an approximate 180° field of view and an image sensor, the digital video image distorted by the lens; an internal image processing circuit processing the digital video image and correcting the distorted image; a control circuit coupled to the image processing circuit configured to receive movement and zoom commands and to transmit a signal to the image processing circuit operative to selectively extract one or more selected regions of interest in the digital video signal, with each region confined to a portion of the approximate 180° field of view; wherein the image processing circuit responds to the commands to generate a digital video signal with the executed commanded movement and zoom to the selected regions of interest by correcting optical distortion to simulate the function of a pan-and-tilt camera with zoom capability, and capable of selecting a plurality of regions of interest covering the entire approximate 180° field of view while maintaining visibility within the entire approximate 180° field of view for display.

According to various embodiments, there is provided: A video camera comprising: a wide-angle camera system configured to generate a digital video image using a lens providing an approximate hemispherical field of view and an image sensor, the digital video image distorted by the lens; an image processing circuit that receives and processes the distorted electronic image data to mathematically correct the distortion and can magnify and display views correlating to a plurality of generated virtual cameras monitoring individual regions of interest within the electronic image, where the camera system simultaneously maintains a view covering the entire approximate visual hemisphere; and a control circuit that transmits commands to the image processing circuit relating to one or more selected virtual cameras, the image processing circuit responding to the commands with executed commanded movement by correcting optical distortion to emulate a pan, tilt, or zoom command in a specified virtual camera.

According to various embodiments, there is provided: A method of operating a video camera, comprising the steps of: a) converting a distorted optical image into a distortion corrected digital video image; b) executing movement and zoom operations on the digital video image by electronically correcting the distorted optical image using parameters matched to the lens; c) associating movement and zoom commands to a plurality of selected virtual cameras electronically created within the digital video image, wherein each virtual camera image monitors a portion of the captured distorted optical image; and d) transmitting desired virtual camera images and the complete digital video image for simultaneous viewing, with each virtual camera image and the digital video image scalable to different resolutions.

According to various embodiments, there is provided: A multi object processing video camera, comprising: a wide-angle optical unit connected to an image sensor and a capture circuit configured to capture a wide-angle field of view in high resolution and generate a digital image; a processing circuit inside the camera which: executes a plurality of software tasks on a plurality of regions of the digital image, one of the software tasks always correcting the geometric distortions introduced by the wide-angle optical unit; monitors multiple specific objects while simultaneously monitoring other objects, the processing of the digital image covering both the wide-angle frame and multiple virtual cameras each viewing a region of interest within the frame, and simultaneously monitoring multiple objects in multiple regions of interest; selectively conditions transmission of a partial set of images from the camera based on the results of image processing event detection and the monitoring multiple objects in ones of software tasks; and an internal program and data memory to hold the software for execution by the processing circuit.

According to various embodiments, there is provided: A multi object processing video camera, comprising: a wide-angle optical unit connected to an image sensor and a capture circuit configured to capture a wide-angle field of view in high resolution converted to a digital image; a processing circuit within the camera which: executes a plurality of software tasks on the captured wide-angle field of view, one of the software tasks being always the correction of geometric distortions introduced by the wide-angle optical unit; monitors multiple specific objects without losing surveillance of other objects, the processing of the digital image covering a wide-angle frame or regions of interest within the frame, and simultaneously monitors multiple objects; and selectively conditions transmission of images based on the results of an event detection algorithm and the action of monitoring multiple objects in at least one of the software tasks; and an internal program and data memory to hold the software for execution by the processing circuit.

According to various embodiments, there is provided: A multi object processing video camera, comprising: a processing circuit within a digital video camera which: executes a plurality of software tasks on a digital image, one of the software tasks always being correction of optical geometric distortions; and selectively conditions transmission of a partial set of images from the digital camera onto a network based on the results of event detection image processing in at least one of the software tasks; and validates the results of another multi object processing video camera coupled to the digital camera; and the digital camera including software to autonomously identify a specific object, while monitoring other objects, to track and communicate position and trajectory data of the object to at least one other multi object processing video camera, or receive position and trajectory data from another multi object processing video camera, and automatically maintain monitoring of the specific object as it moves across the field of view of multiple multi object processing video camera; and a program and data memory to hold the software for execution by the processing circuit.

According to various embodiments, there is provided: A video camera capable of transmitting and receiving more than one Internet Protocol address comprising: an optical and imaging system capable of capturing a wide field of view from a single fixed wide-angle digital video camera from which a plurality of views may be extracted; an image processing circuit correcting distortions introduced by the optical and imaging system and emulating a pan, tilt, and zoom motion for each view; a transmitting circuit coupled to the processing circuit converting video images into data packets and transmitting a plurality of packets with a different transmitting Internet Protocol address for each extracted view; and a receiving circuit capable of receiving packets with Internet Protocol addresses, with the packets comprising control information and the packet address indicating a view that the control information pertains to, the control information including commands for processing at least one extracted view to emulate a pan, tilt, zoom motion.

According to various embodiments, there is provided: A method of transmitting a plurality of views from a wide-angle video camera comprising: processing extracted views corresponding to a plurality of virtual cameras in an image processing circuit internal to a single wide-angle video camera that includes emulating a mechanical pan, tilt, zoom motion in each virtual camera; converting each of the plurality of views for each virtual camera into a plurality of packets suitable for transmission over an Internet Protocol network; transmitting the packets with a packet stream uniquely addressed for each virtual camera with an Internet Protocol address; and receiving view processing control information in a packet addressed to the Internet Protocol address corresponding to a virtual camera extracted view.

According to various embodiments, there is provided: A computer readable medium containing programming instructions for transmitting a plurality of views from a wide angle video camera and receiving control information, the programming instructions for: capturing a sequence of images and extracting a plurality of views from a single wide-angle video camera corresponding to a plurality of generated virtual cameras using an internal image processing circuit to independently emulate a mechanical pan, tilt, zoom motion for each virtual camera; converting each of the plurality of views into a plurality of packets suitable for transmission over an Internet Protocol network; assigning to each virtual camera a unique Internet Protocol address; and transmitting the packets using a different transmitting Internet Protocol address for each virtual camera.

According to various embodiments, there is provided: A video camera capable of transmitting and receiving more than one Internet Protocol address comprising: an optical and imaging system capable of capturing a wide field of view from a single fixed wide-angle digital video camera from which a plurality of views may be extracted; an image processing circuit correcting distortions introduced by the optical and imaging system and emulating a pan, tilt, and zoom motion for each view; a transmitting circuit coupled to the processing circuit converting a plurality of video image views into multiplexed data packets and transmitting a plurality of multiplexed packets with a different transmitting Internet Protocol address for each of the plurality of extracted view; and a receiving circuit capable of receiving packets with Internet Protocol addresses, with the packets comprising control information and the packet address indicating a view that the control information pertains to, the control information including commands for processing at least one extracted view to emulate a pan, tilt, zoom motion.

According to various embodiments, there is provided: A method of transmitting a plurality of views from a wide-angle video camera, comprising the steps of: processing extracted views corresponding to a plurality of virtual cameras in an image processing circuit internal to a single wide-angle video camera that includes emulating a mechanical pan, tilt, zoom motion in each virtual camera; multiplexing the extracted virtual camera views into a data stream for transmission; converting the data stream into a plurality of packets suitable for transmission over an Internet Protocol network, wherein a network address identifies each virtual camera view; and receiving view processing control information in a packet addressed to a network address corresponding to a virtual camera extracted view.

According to various embodiments, there is provided: A method of transmitting multiple views from a wide-angle video camera, comprising the steps of: processing extracted views in an image processing circuit internal to a single wide-angle video camera that includes emulating a mechanical pan, tilt, zoom motion for each view, each view designated by a unique network address; multiplexing the extracted addressed views into a data stream for transmission; and receiving view processing control information for one or more views using the network address for the desired extracted view.

According to various embodiments, there is provided: A camera with adjustable image projection distortion correction comprising: a) a wide-angle camera system configured to generate a digital video image using a lens providing an approximate hemispherical field of view and an image sensor, the digital video image distorted by the lens; b) an image processing circuit that receives and processes the distorted electronic image data to mathematically correct the distortion and can magnify and display views correlating to a plurality of generated virtual cameras monitoring individual regions of interest within the electronic image, where the camera system simultaneously maintains a view covering the entire approximate visual hemisphere, and where the correction includes using multiple distortion parameters to correct optical distortion that vary; c) a memory storing multiple parameters automatically selected to correct the optical distortions and interpolate parameters from the stored parameters if required; d) the multiple parameters used for correction held in a memory within the housing of the lens system or internal to the camera; e) a control circuit that transmits commands to the image processing circuit relating to one or more selected virtual cameras, the image processing circuit responding to the commands with executed commanded movement by correcting optical distortion to emulate a pan, tilt, or zoom command in a specified virtual camera; and f) an individual pixel created using a weighted sum of a selected group of pixels to be used in the correction, wherein the weight of each pixel of the group of pixels is determined by its distance from the individual pixel based on their relative coordinates derived from the distortion parameter correction.

According to various embodiments, there is provided: A method for operating a camera with adjustable image projection distortion correction, comprising the steps of: a) capturing a distorted optical image using a wide-angle lens system mounted on a digital camera into a distortion corrected digital video image; b) reducing optical distortions from the combination of the wide-angle lens system and an image sensor, wherein the reducing includes reference to a table of parameters specific to the particular wide-angle lens system and the image sensor combination held in a solid-state memory; and c) using an image processing circuit to reduce the optical distortions and electronically correct the distorted optical image to execute movement and zoom operations on the digital video image; d) wherein the table maps an individual pixel of a corrected output digital video image to an accurate coordinate in the captured distorted image, wherein pixel values within a local neighborhood of the distorted image are used to provide a weighted sum in an estimate of the value at the accurate coordinate on the sensed image; and e) wherein the weight assigned each pixel within the local neighborhood is determined by its distance from the accurate coordinate provided by the table.

According to various embodiments, there is provided: A camera with reduced optical distortion comprising: a) an optical lens system capturing a wide-angle view; b) an image sensor and circuitry converting the wide-angle view to a digital data signal suitable for use by an image processing circuit; c) the image processing circuit configured to execute a plurality of software tasks that include—reducing optical distortions introduced by the combination of the optical lens system and the image sensor where the reducing includes reference to a table of parameters; monitoring multiple specific objects while simultaneously maintaining surveillance of other objects, the processing of the digital data covering the wide-angle view or regions of interest within the view; and selectively conditioning transmission of views based on the action of the monitored multiple objects; d) wherein the table of parameters is stored in a solid-state memory and maps an individual pixel of a corrected image to an accurate coordinate in a captured image, wherein pixel values within a selected group are in a local neighborhood and are used to provide a weighted sum estimate of the value at the accurate coordinate on the corrected image.

According to various embodiments, there is provided: A digital camera reducing optical distortion from an optical system comprising: a wide-angle lens system mounted on a digital camera possessing internal image processing circuitry; and the image processing circuitry reducing optical distortions in a captured image, wherein the reducing includes reference to a table of parameters and wherein the processing circuit performs at least one of the following software tasks—executes a plurality of software tasks on a digital image, one of the software tasks always being reducing optical geometric distortions; selectively conditions transmission of a partial set of images from the digital camera onto a network based on the results of event detection image processing; validates the results of event detection by another digital camera coupled to the digital camera; and autonomously identifies a specific object, while monitoring other objects, to track and communicate position and trajectory data of the object to at least one other digital camera, or receive position and trajectory data from another digital camera, and automatically maintain monitoring of the specific object as it moves across the field of view of multiple digital cameras.

According to various embodiments, there is provided: A method for multi object processing in a wide-angle video camera, comprising the steps of: capturing a wide-angle view using a wide-angle lens and sensor system mounted on a video camera possessing internal image processing circuitry; converting the captured wide-angle view into a digital view; executing a plurality of software tasks in the image processing circuitry, wherein at least one of the following software tasks is performed—reducing optical distortions in the digital view; extracting at least one region of interest from the digital view; selectively conditioning transmission of a partial set of views from the video camera onto a network based on the results of event detection image processing; validating the results of event detection by another video camera coupled to the video camera; and autonomously identifying a specific object, while monitoring other objects, to track and communicate position and trajectory data of the object to at least one other video camera, or receiving position and trajectory data from another video camera, and automatically maintaining monitoring of the specific object as it moves across the field of view of multiple video cameras; wherein the reducing includes reference to a table of parameters organized as a forward or reverse mapping.

According to various embodiments, there is provided: A method for image processing in a wide-angle video camera, comprising the steps of: capturing a wide-angle view using a wide-angle lens and sensor system mounted on a video camera possessing internal image processing circuitry; converting the captured wide-angle view into a digital view; reducing optical distortions in the digital view; extracting at least one region of interest from the digital view; autonomously identifying a specific object, while monitoring other objects, to track and communicate position and trajectory data of the object to at least one other video camera, or receive position and trajectory data from another video camera, and automatically maintain monitoring of the specific object as it moves across the field of view of multiple video cameras; wherein the reducing includes reference to a table of parameters organized as a forward or reverse mapping.

According to various embodiments, there is provided: A method of transmitting a plurality of views from a video camera, comprising the steps of: (a) capturing a scene in a wide-angle video camera and extracting at least one view of a possible plurality of views covering the entire scene; (b) processing any extracted views to correspond to a virtual camera in an image processing circuit internal to the wide-angle video camera that includes emulating a mechanical pan, tilt, zoom motion in each virtual camera; (c) scaling the plurality of extracted views to independently and respectively specified sizes within the camera, where each view is a geometry corrected wide-angle virtual camera view of a region of interest selectively extracted and each independently scaled and each independently controlled as a virtual camera; (d) compositing at least a portion of the virtual camera views into one or more views to form a composite video which includes multiple different views according to step (b) and (c) selectively superimposed, adjacent, or tiled; (e) converting each of the composited virtual camera views into a plurality of packets suitable for transmission over an Internet Protocol network, with a packet stream uniquely addressed for each virtual camera with an Internet Protocol address; and (f) whereby a compositing of superimposed, adjacent, or tiled views can be accomplished by the camera, or by a base station using a plurality of composited views, wherein the base station supports a surveillance monitor able to display the views simultaneously, superimposed, adjacent, or tiled, and individually scaled as selected, and selectively positioned in the framed view of the monitor.

According to various embodiments, there is provided: A video camera capable of transmitting and receiving more than one Internet Protocol address comprising: an optical and imaging system capable of capturing a wide field of view from a fixed wide-angle digital video camera from which a plurality of views may be extracted; an image processing circuit correcting distortions introduced by the optical and imaging system and emulating a pan, tilt, and zoom motion for each view and selectively extracting multiple views centered on multiple regions of interest in the view to process the multiple view data into composited separate frame images, each view data set independently scaled to a specified size from a different emulated pan-tilt-zoom movement; and a transmitting circuit coupled to the processing circuit converting video images into data packets and transmitting a plurality of packets with a different transmitting Internet Protocol address for each composited view data set; whereby the composited views are viewable simultaneously as selectively superimposed, tiled, or adjacent images that can simultaneously include images and scenes from different wide-angle video cameras.

According to various embodiments, there is provided: A method of transmitting a plurality of views from a wide-angle video camera comprising: processing image data for a plurality of views extracted from a captured wide-angle image in an image processing circuit internal to a wide-angle video camera that can include emulating a mechanical pan, tilt, zoom motion in each extracted view and correcting optical distortion introduced by at least a wide-angle lens and selecting at least one region of interest from within the wide-angle image; converting each of the plurality of views and the wide-angle image into a plurality of packets suitable for transmission over an Internet Protocol network; compositing at least a portion of the plurality of views and the wide-angle image to form a composite video which includes multiple different views selectively superimposed, adjacent, or tiled, which can include the selected at least one region of interest; and transmitting the packets with a packet stream uniquely addressed for each composited view and the wide-angle image with a network address for viewing.

According to various embodiments, there is provided: A digital camera reducing optical distortion from an optical system comprising: a wide-angle lens system mounted on a digital camera possessing internal image processing circuitry; the image processing circuitry reducing optical distortions in a captured image, wherein the reducing includes reference to a table of parameters and wherein the processing circuit performs at least one of the following software tasks—executes a plurality of software tasks on a digital image, one of the software tasks always being reducing optical geometric distortions; selectively conditions transmission of a partial set of images from the digital camera onto a network based on the results of event detection image processing; validates the results of event detection by another digital camera coupled to the digital camera; autonomously identifies a specific object, while monitoring other objects, to track and communicate position and trajectory data of the object to at least one other digital camera, or receive position and trajectory data from another digital camera, and automatically maintain monitoring of the specific object as it moves across the field of view of multiple digital cameras; mathematically corrects the distortion to emulate a pan, tilt, zoom movement directed to a plurality of selected regions of interest and simultaneously maintain a view covering the entire captured image; process the multiple regions of interest into composited separate frame images, each composited image data set independently scaled and simultaneously viewable as superimposed, adjacent, or tiled views; a control circuit that transmits commands to the image processing circuit relating to one or more selected regions of interests, the image processing circuit responding to the commands with executed commanded movement by correcting optical distortion to emulate the pan, tilt, or zoom command to a specified region of interest; a memory storing multiple parameters automatically selected to correct the optical distortions and interpolate parameters from the stored parameters if required; a transmitting circuit coupled to the processing circuit converting output video images into data packets and transmitting a plurality of packets with a different transmitting Internet Protocol address for each region of interest view and composited image data set; and an individual pixel created using a weighted sum of a selected group of pixels to be used in the correction, wherein the weight of each pixel of the group of pixels is determined by its distance from the individual pixel based on their relative coordinates derived from the distortion parameter correction.

According to various embodiments, there is provided: A method of operating a digital camera, comprising the steps of: processing image data for a plurality of views extracted from a captured wide-angle image in an image processing circuit internal to a wide-angle video camera that can include emulating a mechanical pan, tilt, zoom motion in each extracted view and correcting optical distortion introduced by at least a wide-angle lens and selecting at least one region of interest from within the wide-angle image that includes reducing optical distortions using a reference to a table of parameters and wherein a processing circuit performs at least one of the following software tasks—selectively conditioning transmission of a partial set of images from the digital camera onto a network based on the results of event detection image processing; validating the results of event detection by another digital camera coupled to the digital camera; and autonomously identifying a specific object, while monitoring other objects, to track and communicate position and trajectory data of the object to at least one other digital camera, or receive position and trajectory data from another digital camera, and automatically maintain monitoring of the specific object as it moves across the field of view of multiple digital cameras; compositing at least a portion of multiple regions of interest into composited separate frame images, each composited image data set independently scaled and simultaneously viewable as superimposed, adjacent, or tiled views; storing multiple parameters in a memory to automatically select to correct the optical distortions and interpolate parameters from the stored parameters if required; and converting output video images into data packets and transmitting a plurality of packets with a different transmitting network address for each region of interest view and composited image data set, the network address used to control the image data processing of the each region of interest view and composited image data set.

According to various embodiments, there is provided: A video camera, comprising: a wide-angle camera system configured to generate a digital video image using a lens providing an approximate hemispherical field of view and an image sensor, the digital video image distorted by the lens; an image processing circuit that receives and processes the distorted electronic image data to mathematically correct the distortion and can process image data correlating to a plurality of generated virtual cameras monitoring individual regions of interest within the digital video image, that also includes simultaneously monitoring multiple specific objects without losing surveillance of other multiple objects, the processing of the digital image covering either a wide-angle frame or regions of interest within the frame, wherein the camera system simultaneously maintains a view covering the entire approximate visual hemisphere; a control circuit that transmits commands to the image processing circuit relating to one or more selected virtual cameras monitoring a region of interest, the image processing circuit responding to the commands with executed commanded movement by correcting optical distortion to emulate a pan, tilt, or zoom command in a specified virtual camera; and a local memory for storing video image data for later processing or analysis.

According to various embodiments, there is provided: A method of operating a video camera, comprising the steps of: converting a distorted optical electronic video image into a digital video image; executing a plurality of software tasks on at least a portion of the digital video image or locally stored digital video image, wherein the software tasks include at least one of the following—correcting optical geometric distortions introduced by a lens sensor combination; executing movement and zoom operations on the digital video image by electronically correcting the distorted optical image to emulate the movement and zoom operations; conditioning transmission of a partial set of images from the digital video image based on the results of event detection; validating results of a detection algorithm by another video camera coupled to the digital video camera; autonomously identifying a specific object, while monitoring multiple other objects; tracking an identified object; communicating position and trajectory data of an identified object to at least one other video camera; receiving position and trajectory data from another video camera for an object; and automatically tracking and monitoring a specific object as it moves across the field of view of multiple video cameras.

According to various embodiments, there is provided: A surveillance camera, comprising: a wide-angle lens and image sensor system configured to generate a digital video image using a lens capturing an approximate hemispherical image data set, the digital video image optically distorted by the lens and sensor; an image processing circuit that receives and processes the distorted digital video image data to perform at least one of the following tasks: correct optical distortions introduced by the lens and sensor; execute movement and zoom operations on the digital video image by electronically manipulating the digital image data; condition transmission of a partial set of images from the digital video image data based on the results of event detection; validate results of a detection algorithm by another surveillance camera coupled to the surveillance camera; autonomously identify a specific object from multiple monitored objects; track multiple identified object; communicate position and trajectory data of ones of multiple identified object to at least one other surveillance camera; receive position and trajectory data from another surveillance camera for multiple objects; automatically track and monitor a specific object as it moves across the field of view of multiple the surveillance camera; and designate at least one region of interest based on a software algorithm result; a control circuit that transmits commands to the image processing circuit relating to the at least one region of interest, the image processing circuit responding to the commands with executed commanded movement to emulate a pan, tilt, or zoom movement to at least one specified region of interest; and a transmitting circuit transmitting desired region of interest images and the complete digital video image for simultaneous viewing, with each region of interest image and the complete digital video image scalable to different resolutions and controlled to emulate movement and zoom.

According to various embodiments, there is provided: A surveillance video camera, comprising: a wide-angle lens and image sensor system configured to generate a digital video image using a lens capturing an approximate hemispherical image data set, the digital video image optically distorted by the lens and sensor; and a memory storing captured wide-angle video image frames or image frames of regions of interest and a programmable image processing circuit that accesses and processes the stored video image frames to perform at least one of the following tasks: correct optical distortions introduced by the lens and sensor; execute movement and zoom operations on the digital video image by electronically manipulating the digital image data; condition transmission of a partial set of images from the digital video image data based on the results of event detection; validate results of a detection algorithm by another surveillance camera coupled to the surveillance camera; autonomously identify a specific object among multiple monitored objects; track an identified object; communicate position and trajectory data of an identified object to at least one other surveillance camera; receive position and trajectory data from another surveillance camera for an object; and automatically track and monitor a specific object as it moves across the field of view of multiple the surveillance camera; and designate at least one region of interest based on a software algorithm result.

According to various embodiments, there is provided: A method of monitoring an area using a wide-angle digital video camera, comprising: capturing a digital video image using a lens providing an approximate hemispherical field of view and an image sensor to monitor an area, the digital video image distorted by the lens; programming an image processing circuit to process the distorted electronic image video data to mathematically correct the distortion and perform at least one analysis algorithm on the image; using an analysis algorithm result to autonomously designate at least one region of interest correlating to a generated virtual camera monitoring the individual region of interest within the digital video image; monitoring multiple specific objects without losing surveillance of other multiple objects, the processing of the digital image including identifying an object and tracking the object among multiple objects; correcting optical distortion to emulate a pan, tilt, or zoom command in a specified virtual camera; and storing in a local storage at least one video image frame for later processing and analysis.

According to various embodiments, there is provided: A method of using a distorted image data from a wide-angle digital video camera, comprising the steps of: storing image data in a local memory accessible by an image processing circuit; programming an image processing circuit to process image data to mathematically correct the distortion on at least one of live video feed or stored image data; performing at least one analysis algorithm on the image data, the analysis performed on at least one of a live video feed image data or stored image data; using an analysis algorithm result to autonomously designate at least one region of interest within the video image; and monitoring multiple specific objects without losing surveillance of other multiple objects, the processing of the image data including identifying an object and tracking the object among multiple objects.

Modifications and Variations

As will be recognized by those skilled in the art, the innovative concepts described in the present application can be modified and varied over a tremendous range of applications, and accordingly the scope of patented subject matter is not limited by any of the specific exemplary teachings given. It is intended to embrace all such alternatives, modifications and variations that fall within the spirit and broad scope of the appended claims.

The innovations of the present application are preferably implemented using a wide-angle camera, though any type of camera can be used in implementing the present invention, including other anamorphic and non-anamorphic imaging systems. Additionally, although a video camera is described a camera capturing still images at a periodic time interval can be used.

Many of the innovations herein can be thought of in the context of an implemented virtual camera. However, it is not necessary that a virtual camera as such is created. The innovative systems herein can also be described as extracting separate ROIs or views and processing image data to display at different scales centered on different portions of a captured image. These views can be addressable by unique IP addresses.

It is also noted that though some of the present innovations are described as being implemented on computer-readable media using instructions, this is not intended to limit the scope of implementing the present invention. For example, one or more processors could be programmed to perform the innovations herein described.

None of the description in the present application should be read as implying that any particular element, step, or function is an essential element which must be included in the claim scope: THE SCOPE OF PATENTED SUBJECT MATTER IS DEFINED ONLY BY THE ALLOWED CLAIMS. Moreover, none of these claims are intended to invoke paragraph six of 35 USC section 112 unless the exact words "means for" are followed by a participle.

The claims as filed are intended to be as comprehensive as possible, and NO subject matter is intentionally relinquished, dedicated, or abandoned.

What is claimed is:

1. An image processing system comprising:
   one or more processing circuits configured to perform the following functions:
      receive one or more distorted ultra-wide-angle images from at least one of multiple optical units configured to capture distorted ultra-wide-angle images;
      perform event detection within said received distorted ultra-wide-angle images;
      track one or more events detected by said event detection;
      determine, in at least partial dependence on said tracking of said events, location and trajectory data corresponding to said events;
      at least one of:
         use said location and trajectory data to continue to track said events across multiple ones of said distorted ultra-wide-angle images captured by multiple ones of said optical units,
         transmit said location and trajectory data to one or more others of said processing circuits, or
         receive location and trajectory data corresponding to one or more events from one or more others of said processing circuits; and
      selectively dewarp one or more virtual camera views corresponding to said events,
   wherein said virtual camera views are image portions within and smaller than corresponding ones of said received distorted ultra-wide-angle images.

2. The image processing system of claim 1, further comprising one or more network connections, ones of said network connections coupled to corresponding ones of said processing circuits.

3. The image processing system of claim 2, wherein said network connection utilizes an Internet protocol.

4. The image processing system of claim 2, wherein said network connection is used to receive control commands from a base station.

5. The image processing system of claim 1, wherein said event detection comprises one or more of: motion detection, smoke detection, left package detection, face recognition, vehicle license plate recognition, and behavior analysis.

6. The image processing system of claim 1, wherein said location and trajectory data are transmitted to one or more base stations.

7. The image processing system of claim 1, wherein said processing circuit is configured to perform one or more of the following on said virtual camera views: sharpening, contrast adjustment, color adjustment, and resizing.

8. An image processing system comprising:
   multiple ultra-wide-angle optical units, ones of said ultra-wide-angle optical units connected to corresponding image sensors and capture circuits and configured to capture distorted ultra-wide-angle images in high resolution; and
   multiple processing circuits, ones of said processing circuits configured to perform the following functions:
      receive ones of said distorted ultra-wide-angle images from one or more corresponding ones of said optical units;
      perform event detection within said received distorted ultra-wide-angle images;
      track one or more events detected by said event detection;
      determine, in at least partial dependence on said tracking of a particular one of said events, location and trajectory data corresponding to said particular event;
      transmit said location and trajectory data to one or more others of said processing circuits;
      receive location and trajectory data corresponding to one or more specific events from one or more others of said processing circuits and use said received location and trajectory data to automatically continue tracking said specific event as it moves across the field of view of multiple ultra-wide-angle optical units; and
      selectively dewarp one or more virtual camera views corresponding to said events,
   wherein said virtual camera views are image portions within and smaller than corresponding ones of said received distorted ultra-wide-angle images.

9. The image processing system of claim 8, further comprising one or more network connections, ones of said network connections coupled to corresponding ones of said processing circuits.

10. The image processing system of claim 9, wherein said network connection utilizes an Internet protocol.

11. The image processing system of claim 9, wherein said network connection is used to receive control commands from a base station.

12. The image processing system of claim 8, wherein said event detection comprises one or more of: motion detection, smoke detection, left package detection, face recognition, vehicle license plate recognition, and behavior analysis.

13. The image processing system of claim 8, wherein said location and trajectory data are transmitted to one or more base stations.

14. The image processing system of claim 8, wherein ones of said processing circuits are further configured to perform one or more of the following functions on said virtual camera views: sharpening, contrast adjustment, color adjustment, and resizing.

* * * * *